United States Patent
Korb et al.

(10) Patent No.: US 8,360,367 B2
(45) Date of Patent: Jan. 29, 2013

(54) METHODS FOR OPTIMIZING THE PERFORMANCE, COST AND CONSTELLATION DESIGN OF SATELLITES FOR FULL AND PARTIAL EARTH COVERAGE

(75) Inventors: C. Laurence Korb, Potomac, MD (US); Andrew Robert Korb, Rockville, MD (US)

(73) Assignee: C. Laurence Korb, Potomac, MD (US)

( * ) Notice: Subject to any disclaimer, the term of this patent is extended or adjusted under 35 U.S.C. 154(b) by 0 days.

(21) Appl. No.: 13/544,155

(22) Filed: Jul. 9, 2012

(65) Prior Publication Data

US 2012/0276898 A1 Nov. 1, 2012

Related U.S. Application Data

(62) Division of application No. 12/708,482, filed on Feb. 18, 2010, now Pat. No. 8,238,903.

(60) Provisional application No. 61/153,934, filed on Feb. 19, 2009.

(51) Int. Cl.
*B64G 1/10* (2006.01)
(52) U.S. Cl. ............ 244/158.4; 455/12.1; 455/13.2
(58) Field of Classification Search ............ 244/158.4, 244/158 R, 158.5, 159, 158.6
See application file for complete search history.

(56) References Cited

U.S. PATENT DOCUMENTS

| | | | | |
|---|---|---|---|---|
| 5,386,953 | A * | 2/1995 | Stuart | 244/158.4 |
| 5,553,816 | A * | 9/1996 | Perrotta | 244/158.4 |
| 6,178,330 | B1 * | 1/2001 | Alberty et al. | 455/452.2 |
| 6,317,409 | B1 * | 11/2001 | Murakami | 370/203 |
| 7,270,299 | B1 * | 9/2007 | Murphy | 244/158.4 |
| 7,672,384 | B2 * | 3/2010 | Giannakis et al. | 375/260 |
| 2002/0006798 | A1 * | 1/2002 | Jaenecke et al. | 455/446 |
| 2002/0077071 | A1 * | 6/2002 | Williams et al. | 455/130 |

* cited by examiner

*Primary Examiner* — Timothy D Collins
*Assistant Examiner* — Medhat Badawi
(74) *Attorney, Agent, or Firm* — Glenn H. Lenzen; Husch Blackwell LLP

(57) ABSTRACT

A system and method for highly efficient constellations of satellites which give single, double, . . . k-fold redundant full earth imaging coverage, or k-fold coverage for latitudes greater than any selected latitude is given for remote sensing instruments in short periods of time, i.e., continuous coverage, as a function of the parameters of the satellite and the remote sensing instrument for many different types of orbits. A high data rate satellite communication system and method for use with small, mobile cell phone receiving and transmitting stations is also provided. Satellite instrument performance models, full and partial satellite constellation models, and satellite cost models are disclosed and used to optimize the design of satellite systems with vastly improved performance and lower cost over current major satellite systems.

7 Claims, 20 Drawing Sheets

Satellite Track

Edge of scan at
$\pm \theta'_x/2$

METHODS FOR OPTIMIZING THE PERFORMANCE, COST AND CONSTELLATION DESIGN OF SATELLITES FOR FULL AND PARTIAL EARTH COVERAGE

RELATED APPLICATIONS

This application is a divisional application of U.S. patent application Ser. No. 12/708,482, filed Feb. 18, 2010, which claims the benefit of U.S. Provisional Application No. 61/153,934, filed Feb. 19, 2009. The entire contents of U.S. patent application Ser. No. 12/708,482 and U.S. Provisional Application No. 61/153,934 are incorporated herein by reference.

BACKGROUND

Satellites are used for remote measurements of the earth in a wide variety of areas. These include remote measurements of the earth's atmosphere, its land surface, its oceans, measurements for defense, intelligence, and communications. In each field, various instruments are used to make active and passive measurements. For atmospheric measurements, examples are the remote profiling of temperature, the profiling of trace species, measurements of the wind field and measurements of the properties of clouds and aerosols. Thus, satellite remote sensing technology and methodologies may be used to perform a vast array of different measurements. In addition, satellite remote sensing has also been used for planetary measurements.

Measurements from low earth orbit satellites with altitudes in the range of 200 to 800 km provide measurements with high spatial resolution but with only relatively infrequent full earth coverage, for example, once per ½ day to a few days. On the other hand, measurements from satellites in a geosynchronous (GS) orbit provide frequent coverage, of the order of seconds to hours. Typically, a GS orbit is a very high altitude orbit at about 36,000 km altitude above the equator with the property that the satellite has a rotational period around the equator equal to the rotational period of the earth. Thus, a GS satellite stays positioned above the same point on the equator. This allows measurements from this platform to view a large portion of one side of the earth with frequent coverage.

The resolution of measurements from a satellite is limited by the effects of the earth's curvature, the scan angle of the instrument, and the altitude of the orbit. For a GS satellite, measurements made in areas at high latitudes have degraded resolution which for latitudes greater than 60° is significant. If the effective measurement area for a single satellite corresponds approximately to the range of latitudes from −60° to +60°, and, similarly, the range of angles in the equatorial plane from −60° to +60°, it follows that at least 3 GS satellites are required to cover the area in the plane around the equator. GS satellites do not, however, allow reasonable resolution to be obtained in areas above 60° latitude. Moreover, GS satellites do not allow any coverage in the Polar Regions, since a view of this area is blocked by the curvature of the earth and the approximate 8.6° angle of the poles as seen from a GS satellite. For 3 GS satellites, the net angle of measurements of the earth at the edge of the scan in the equatorial plane or at ±60° latitude is approximately 68°.

High altitude GS or stationary satellites in equatorial orbits at about 36,000 km altitude collect earth imaging and communication data for various different user communities. The data include the ultraviolet, visible, near infrared, infrared, microwave and radar frequency regions. The data collected are often in the form of digital imaging data which can be used to make pictures or imagery in one or potentially thousands of spectral regions for photographic or computer aided analysis. The data can be collected in the frame time, a short period of time of the order of seconds to hours, with about 3 satellites from about −60° S to +60° N latitude. Close to full earth coverage can be obtained with an additional 3 to 6 high altitude satellites. The data obtained are low resolution, however, even for very large expensive systems because of the very high altitude orbits.

LeCompte, in a series of six patents and patent applications (U.S. Patent Application Nos. US 2003/0095181A1, May 22, 2003; US 2002/0089588, Jul. 11, 2002; US 2002/0041328, Apr. 11, 2002; U.S. Pat. No. 6,271,877 issued Aug. 7, 2001, U.S. Pat. No. 6,331,870 issued Dec. 18, 2001; and U.S. Pat. No. 6,504,570, issued Jan. 7, 2003) discloses a system for measurements from a Geostationtionary, Geosynchronous orbit. He provides a system, methods, and apparatus for collecting and distributing real time, high resolution images of the earth with a sensor based on multi-megapixel CCD arrays. The system utilizes at least four, 3 axis stabilized satellites in Geostationary orbit to provide world-wide coverage excluding the poles. The current disclosure uses non-geosynchronous orbits at various altitudes to provide measurements with much higher performance and resolution, full earth coverage including the polar regions and areas at high latitudes, and significant cost advantages over prior art systems.

The use of a zoom type feature, which is similar to the zoom feature of a camera, has been used on geosynchronous GS platforms. This feature allows a small area of the earth to be observed with more detail than would normally be the case. However, in order to obtain this detailed view, the coverage of the rest of the earth that would normally be viewed by a given satellite is lost. For a one satellite GS system, this would result in a loss of all of the data that would normally be obtained, and in a 3 satellite GS system this would result in a loss of ⅓ of the data, which severely limits the use of this feature.

For a low or mid-altitude satellite (LMAS) constellation, an ultra-high performance measurement can be made in any given small area of the earth by acquiring and viewing only that area when it first appears in a portion of the area being scanned by a given satellite. The coverage of the small area continues until the satellite leaves the coverage area and as coverage of the small area of interest from a given satellite ends, coverage of the small area of interest from the following satellite begins. This process provides continuous coverage of the small area of interest from successive satellites. For a system with n satellites, up to n ultra-high performance measurements of small areas can be made simultaneously, one measurement for each satellite.

The only loss of coverage as a result of the use of the ultra-high performance feature is in the single area containing the small feature of interest. For an LMAS system with 200 satellites, this would result in a loss of coverage of 1/200 or 0.5% of the coverage of the earth. Moreover, an LMAS system has a lower altitude than a GS system, which advantageously allows a much higher diffraction limited resolution than a GS system, e.g., more than 100 times higher resolution for a 200 km altitude LMAS system.

Luders (1961) described constellations for continuous, complete global coverage using computer search methods with the "streets of coverage" technique for polar and inclined orbit constellations. Rider (1985) and Adams and Rider (1987) described continuous global coverage for single, double, . . . k-fold redundant coverage using the "streets of coverage" technique for optimal, i.e., the minimum number of satellites for a given coverage, polar orbit constellations. They also described k-fold redundant coverage for latitudes above given latitudinal planes, i.e., 0°, 30°, 45°, and 60°. Rider (1986) used the "streets of coverage" technique to obtain constellations for inclined orbits. Walker (1970) used circular polar orbits and, in 1977, used inclined orbits to obtain orbit constellations using computer search and analytic techniques where each satellite of the constellation can have its own orbital plane. This work was used only for the case of very small satellite constellations.

The "streets of coverage" technique uses a conical scan pattern to scan the area within a series of minor circles which are centered at each sub-satellite point on the spherical surface of the earth. The area of continuous overlay of these circular patterns on the earth at a given point in time for satellites in one orbital plane and for satellites in different orbital planes then describes the area of continuous coverage. For continuous whole earth coverage, Rider gives a complex analytic method for determining the orbital planes, the number of satellites, the effective "streets of coverage" angle of the conical scan pattern, and the multiplicity of the redundant, i.e., single, double, or k-fold coverage as a function of these parameters. Results are given for optimally phased and unphased polar satellite constellations for constellation sizes up to approximately 160 satellites for single coverage.

Patent WO 03/040653A1, filed on Nov. 11, 2002 by A. B. Burns, "Improved Real or Near Real Time Earth Imaging Information System and Method for Providing Imaging Information" claims to provide methods for contiguous or overlapping coverage over the earth (95% of earth) for imaging measurements from relatively low altitude elliptical polar orbiting satellites at 640 km, as well as for other non-satellite platforms. On pages 52-55 of this patent, "the specific configuration of the satellite network having particular regard to how real time global coverage is achieved" (p. 52), is described. The method, calculations, and instructions the patent gives for obtaining contiguous, overlapping coverage "so that the footprints contiguously and concurrently cover a substantial part of the earth's surface continuously and dynamically" (p. 4), for 95% of the earth's surface are as follows. First, the surface area of the 95% of the earth covered is calculated as $4.856*10^8$ km² (p. 53, lines 11 and 12). The effective area covered by a single satellite is then calculated as 212,677.58 km² (p. 54, line 21). "The number of satellites required to image a given proportion of the earth's surface" (p. 55, lines 1-2) is then given as $$\text{Number of satellites} = \text{area to be covered/area of coverage} \quad (A)$$
$$= 4.856*10^8/212677.58$$
$$= 2283 \text{ satelittes.}$$

Equation (A) requires that each satellite in the constellation of satellites cover a different area on the earth of the same size, 212,677 km². That is, the satellites must provide uniform spatial coverage over the earth. FIG. 31b in the Burns patent shows a series of these contiguous coverage areas of equal size. However, Eq. (A) and the Burns patent do not give a correct method for how this uniform coverage could be achieved for the case of satellites.

For example, FIG. 28 is one of the four detailed figures for imaging in the Burns patent. It is described in the brief description of the drawings as "a diagram showing how a single polar orbiting satellite images the earth's surface". It shows a series of parallel orbits going in a north-south direction which have approximately uniform width in the east-west direction and appear to give uniform coverage. These orbits, however, do not go over the poles (with the exception of the central orbit) and are thus not the required polar orbits as specified in the patent. These orbits also do not go around a circumference of the earth (with the exceptions of the central orbit), that is, they do not make great circles or ellipses around the earth, and therefore, are not possible satellite orbits. Thus, this figure does not describe satellite orbits except for the central orbit and cannot provide the uniform coverage specified in the patent.

The Burns patent also states that elliptical polar orbits are required and that circular polar orbits will not work. Burns, however, only attempts to treat the case of a circular polar orbit as described by Eq. (A) with an orbit altitude of 640 km and does not attempt to treat the case of an elliptical orbit.

Polar orbiting satellites have the property that the satellite orbit passes over the north and south poles. As shown in FIG. 1 of his patent, and similar figures in other patents, constellations of polar orbits have maximum orbital separation at the equator, the orbits converge and the separation decreases at mid-latitudes, and the satellite orbits converge and essentially totally overlap as the orbits approach the poles. As a result, the satellite spacing is maximum at the equator in the longitudinal, east-west, direction, decreases significantly at mid-latitudes, and goes to zero at the poles. The corresponding coverage per satellite is highly non-uniform with the amount of coverage and overlap varying by more than 20 times over the surface of the earth for the case Burns considers.

As discussed above, Eq. (A) assumes uniform satellite coverage over the earth to calculate the number of satellites. Since this does not occur for polar orbiting satellites, Eq. (A) and the Burns method is fundamentally incorrect. Further, if Eq. (A) is used, then overlap in coverage in one area of the earth, e.g., as occurs in the longitudinal direction at high latitudes for polar orbits, must be compensated for by corresponding large gaps in coverage in other areas of the earth. These gaps in coverage result from the Burns methodology and do not allow the contiguous/overlapping claims of the Burns patent to be realized for satellites.

The equations in this disclosure can be applied to the Burns patent parameters to calculate the number of satellites required for full earth coverage. The chord length of his measurement 2X is determined from the square root of Burns' effective area of coverage, 212,677.6 km² for a single satellite, which is a square, and which yields 2X=461.17 km. From Eqs. (1) and (2), the number of polar planes required as the satellites pass through the equatorial plane are calculated as $n_e$=44, and the required number of satellites per polar plane from Eq. (4) as $n_p$=87. This, in turn, gives the minimum number of satellites needed for coverage over the earth from Eq. (6) as 3828. This calculation includes the effects of overlapping coverage.

The 3828 satellites required based upon the foregoing are considerably larger than the 2283 satellites determined by Burns using his Eq. (A). To get full earth coverage in the polar plane with the Burns parameters, 87 satellites per polar plane are required. When the total number of satellites calculated in the Burns patent is divided by 87 satellites per polar plane, we find that only 26.24 planes would be available across the equatorial plane. This would provide only approximately 60% coverage and would give 40% gaps in coverage in the equatorial plane, i.e., 26.24/44≈0.6. A similar result is obtained for the percent coverage and gaps in coverage in the polar plane.

Thus, it is clear from the preceding detailed calculation that to compensate for the overlapping coverage inherent in constellations of polar orbiting satellites, the Burns patent methodology produces large gaps (approximately 40%) in full earth coverage. Since his stated design was for 95% full earth coverage, the effective gap in coverage in the Burns methodology is about 35%. Thus the contiguous/overlapping claims of the Burns patent cannot be met for satellite application.

SUMMARY OF THE INVENTION

The basic method that is used in the current disclosure for the satellite constellation design for the case of polar orbiting satellites is outlined as follows. The method uses a scan over two perpendicular angular planes, one in the plane of the satellite motion, the other in the cross-track direction, which is more efficient than and in contrast to the "streets of coverage" technique, which uses a conical scan to produce circular scan patterns on the earth. The method also uses a physically based criterion to determine the minimum number of satellites required to produce continuous, complete earth coverage.

For polar orbiting satellites, the equatorial plane has the greatest circumference of any latitudinal plane. To provide contiguous overlapping coverage over the earth, contiguous or overlapping coverage over the equatorial plane must first be established. Once this is achieved, full coverage over every other latitudinal plane will exist. In fact, overlapping coverage over every other latitudinal plane will also exist.

The methodology of the constellation design of the present invention is founded upon an analytic technique. First the angular separation of the constellation of satellites in the equatorial plane (as they pass through this plane) is calculated from Eq. (1), followed by a calculation of the number of measurements needed in the equatorial plane from Eq. (2). This is rounded up to get the number of polar planes $n_e$, or equivalently, the number of satellites needed as they cross the equatorial plane. Then the satellite angular separation in the equatorial plane is recalculated from Eq. (3), and the number of satellites $n_p$ needed in each polar plane based on Eq. (4) is then determined. The satellite angular separation in the polar plane is derived from Eq. (5), and the number of satellites needed for full earth coverage is calculated using Eq. (6).

The constellations presented herein are generally much more efficient for continuous single, double, . . . k-fold redundant global coverage than prior art constellations. Namely, the same coverage can be obtained with the same altitude for constellations using the methods of the instant invention with about 40% fewer satellites than those required by Rider. This applies for constellation sizes of 8 or more satellites.

This disclosure describes innovations in at least three areas which are combined to produce new satellite system designs and measurement capabilities with much higher performance than the current state-of-the art. These areas are as follows. One—performance models are developed which give the performance of a wide variety of satellite instruments in terms of the satellite, instrument, and constellation parameters. Two—highly efficient constellation designs and methods are developed for full and partial satellite constellations. Three—cost models are developed which relate the instrument performance parameters, the constellation parameters, and the system cost. The combination of these three methods allows the satellite system performance to be optimized for any given cost. Using the combination of these methods, it is shown that full satellite constellations with simultaneous full earth coverage can be used to obtain much higher resolution than geosynchronous and high altitude systems. It is also shown that partial satellite constellation designs can be used to obtain greatly improved satellite revisit time or greatly improved resolution over current low altitude satellites. It is also shown that high performance low altitude systems can be used to achieve continuous coverage. Further, these systems have the same or lower cost as current low performance systems.

Methods are provided herein for the design and configuration of constellations of satellites which give single, double, triple, . . . k-fold redundant full earth imaging coverage for remote sensing instruments in short periods of time, i.e., essentially continuous coverage. Methods are also disclosed for the design of constellations of satellites which give single, double, triple, . . . k-fold redundant coverage for all latitudes greater than any selected latitude. The constellation design is given for polar orbiting satellites as a function of the altitude of the orbit and as a function of the parameters of the remote sensing instrument as well as for a number of other different types of orbits.

These methods are also used to provide the design for high data rate satellite communication systems for use with small stationary or mobile cell phone stations. These systems use low altitudes with small zenith angles and as a result have large signal advantages over current conventional geosynchronous or low altitude systems.

General methods are presented for evaluating and comparing the performance of remote sensing instruments for different satellite, instrument and constellation parameters for active and passive instruments. The methods demonstrate that full earth coverage measurements with small zenith measurement angles can be obtained with low or mid-altitude satellite LMAS constellations with much higher performance than can be obtained with GS satellite systems, in times as short as a fraction of a second. This requires constellations with a large number of satellites.

Methods are also given which allow trade-offs between the performance of remote sensing systems, the orbital altitude, the zenith measurement angle, the constellation size and cost. It is shown that constellations of low or mid altitude satellites with small telescope diameters have the same or lower cost as one or a few large satellites. The resultant LMAS systems have 25 times higher resolution than GS systems, the same or lower cost, fast measurement times, and full vs. partial earth coverage. These LMAS systems can thus replace GS systems for most applications. The cases of both signal limited and diffraction limited performance are given.

Methods are also presented for the design of partial constellations of satellites that greatly reduce the number of satellites required for full earth coverage compared to full LMAS constellations. These partial constellations give full earth coverage in a time of a fraction of a satellite orbit for one design and in times of several orbits for a second design. This has particular application to low altitude systems as well as to GS systems.

General methods are given which allow performance, cost, and partial constellation models to be used to improve the satellite revisit time for high performance, low altitude satellites. It is shown that the satellite revisit time can be reduced by more than 100 times from approximately 12 hours to 2 minutes at the same cost and with the same performance. These methods can be used to replace single low altitude satellites with LMAS systems which give much more frequent coverage or, alternatively, higher spatial resolution. Methods are also given which allow continuous coverage to be obtained. The case of both signal limited and diffraction limited performance are presented.

Methods are also given that use an ultra-high performance mode for imaging small spatial areas of interest with essentially continuous coverage and very high performance.

The methodologies given in this disclosure apply to both 2D and 3D, stereo, measurements of the earth with multiple redundant, e.g., 2-, 3-, or k-fold continuous, full earth coverage. The case for 3D coverage is treated for both stationary and high velocity moving objects.

The methods herein defined apply to a large number of different types of satellite constellations and circular and elliptical orbits including polar orbits, polar orbits rotated by an angle φ relative to the polar axis, equatorial orbits, and orbits making an angle γ with the equatorial plane.

The methods given in this disclosure for improving the performance and cost of satellite systems can be used with the constellation designs given in this disclosure. These offer significant advantages over prior constellation designs. Alternatively, the methods given here for improving the performance and cost of satellite systems can also be used with other constellation designs.

The LMAS constellations use small diameter telescopes and thus use low level technology. The LMAS constellations also have a large number of satellites and are thus insensitive to the failure or loss of a single satellite

BRIEF DESCRIPTION OF THE DRAWINGS

FIG. 12b—A phase shift of one-half the coverage area $θ_x$ by $θ_y$ is shown between each adjacent satellite plane for the $θ_x$ longitudinal, direction.

FIG. 14b—A set of q satellites with an angular coverage $qθ'_x$ greater than or equal to $θ_{rot}$, the earth's angular rotation at the equator in the time for one satellite orbit, is shown for a 2D view of the equatorial plane.

FIG. 17a—A 2D view of four satellites providing continuous, contiguous coverage of the equatorial plane.

FIG. 17b—A 2D view of two satellites providing coverage in a time of ½ the orbital period.

DETAILED DESCRIPTION

Satellite Constellation Design and Configuration

Figure 2:
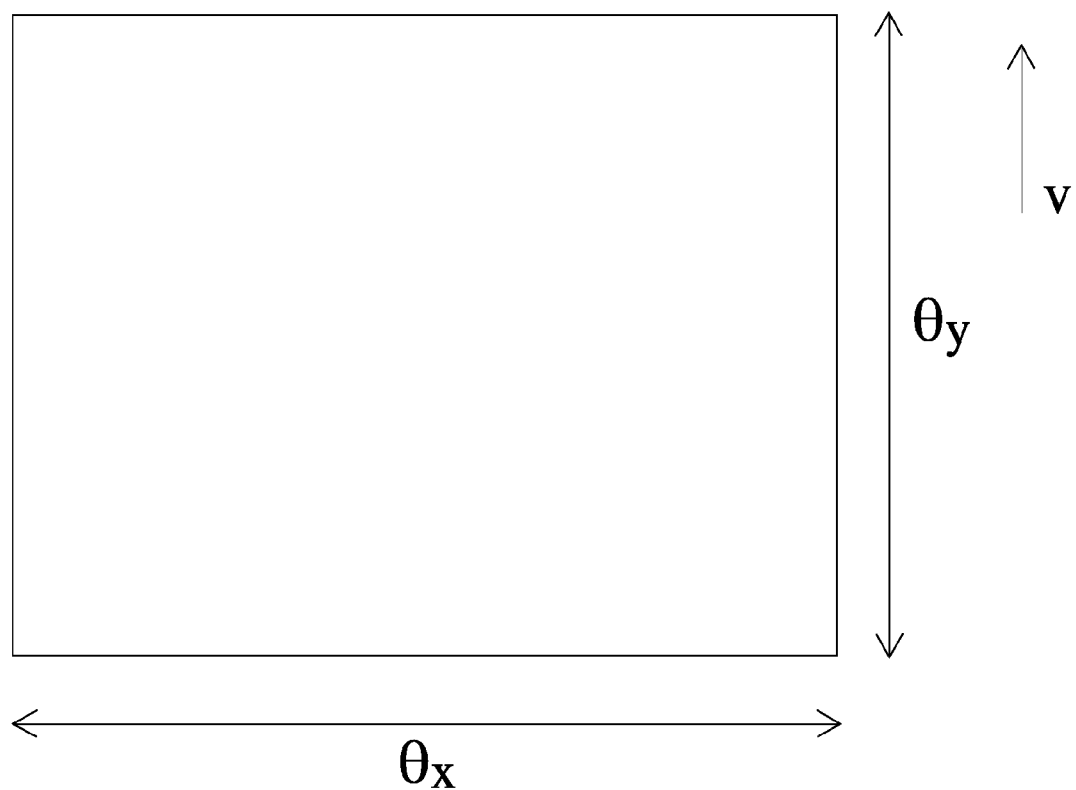
FIG. 2—Cross track scan angle $θ_x$ and along track scan angle $θ_y$ in the same plane as satellite velocity vector v.

There are many ways of making this scan from a satellite and using it to cover a 2 dimensional surface on the earth. In one technique, one dimension of the scan, for example the angle $θ_x$ in the cross track direction, can be made with a scanning mechanism, while the other dimension of the scan, for example the angle $θ_y$ in the along track direction, can be provided by the motion of the satellite or alternatively by a scanning mechanism (FIG. 2). The along track direction for this example is the north-south direction, which is in the polar plane. Thus, the satellites for this example are polar orbiting satellites.

Figure 3A:
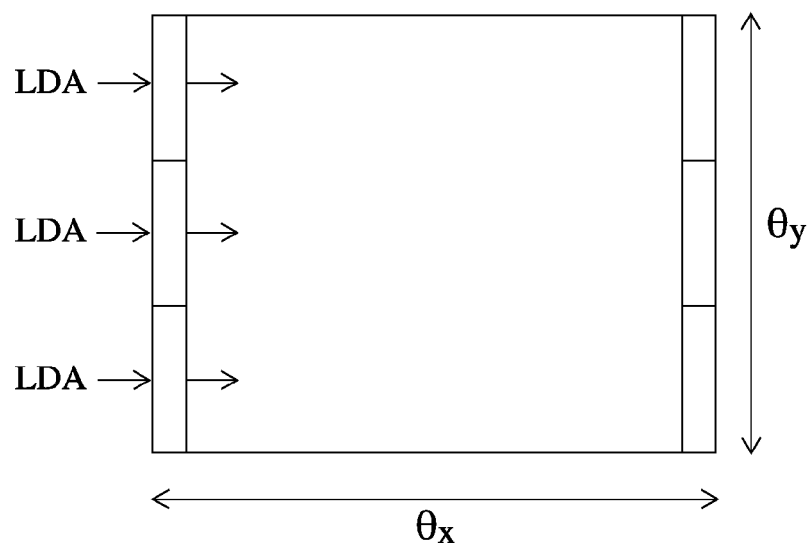
FIG. 3a—cross track scan with linear detector array (LDA).
Figure 3B:
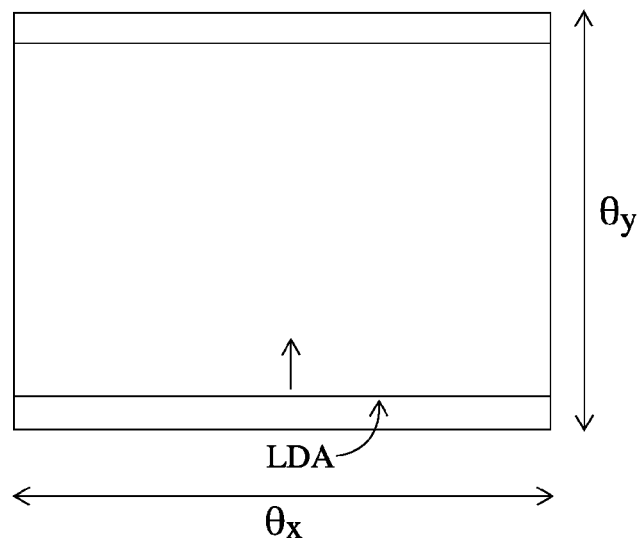
FIG. 3b—pushbroom scan using the satellite motion for the along track scan with a linear detector array LDA.
Figure 3C:
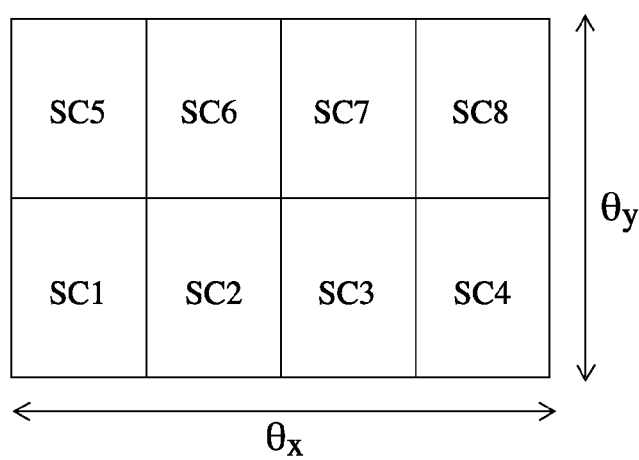
FIG. 3c—multiple position 2D step scan (SCi) with 8 positions.

The cross track scan could be performed with a single detector such that contiguous resolution elements are scanned within a scan line. The along track direction of the scan could be obtained, for example, from a series of scan lines made with a single detector or from a series of groups of scan lines made with a linear detector array LDA (FIG. 3a). The scan is made such that adjacent scan lines are contiguous. The 2 dimensional scan could also be made, for example, using a linear detector array in a push-broom configuration positioned to provide the scan information in the $θ_x$ direction in a non-scanning configuration with the satellite motion providing the scan in the $\theta_y$ direction (FIG. 3b). Alternatively, a two dimensional detector array could be used with image motion compensation to provide the scan measurement with the system in a stationary mode for a very large 2D array and wide field optics or in a step scan mode with multiple positions SCi for a smaller array (FIG. 3c). Although the example used here is for the case of polar orbiting satellites, this work also applies to non-polar orbiting satellite configurations such as equatorial orbits and orbits making various angles with the equatorial plane, as will be discussed.

Figure 1:
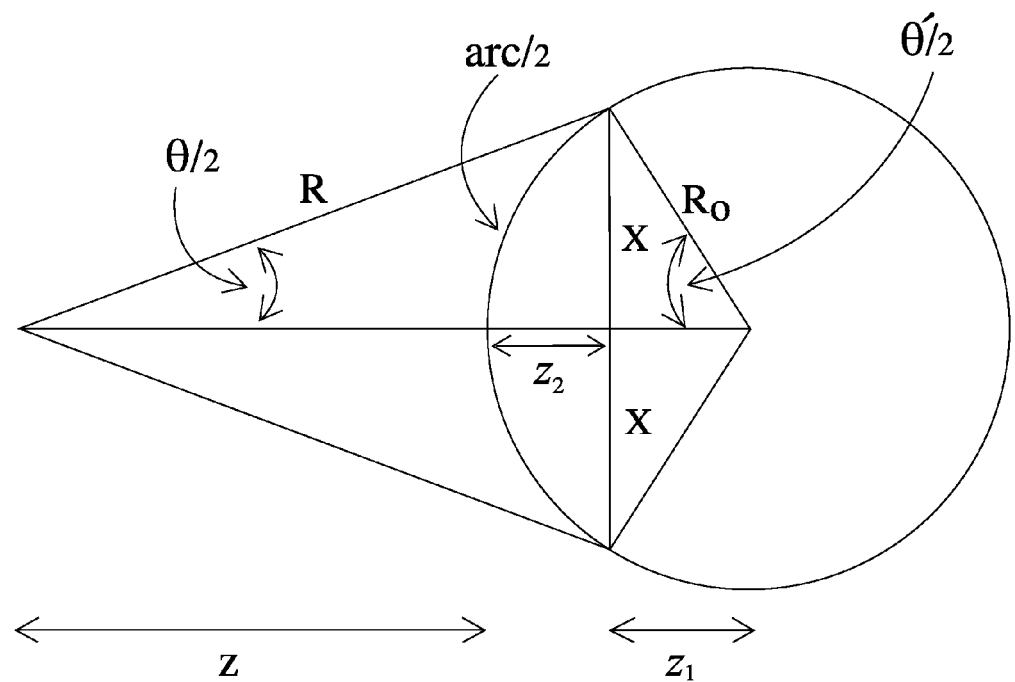
FIG. 1—Geometry of a scanning measurement for a satellite at altitude z with scan angle θ, range R, arc length arc, sag height $z_2$ and, as seen from the center of the earth, a scan angle θ', chord length 2X, and $z_1 = R_0 - z_2$ where $R_0$ is the radius of the earth. It is noted that z=z, $z_1$=$z_1$ and $z_2$=$z_2$ are used interchangeably.
Figure 4:
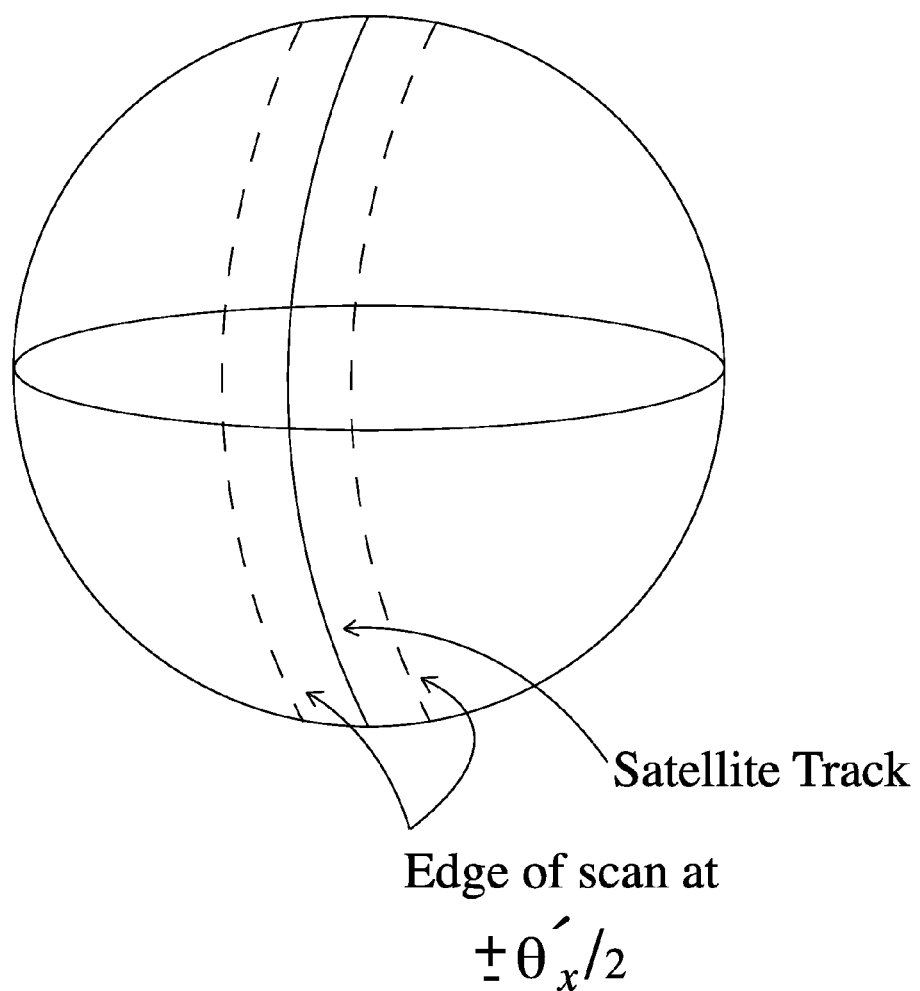
FIG. 4—Projection of the satellite track on the earth for a polar orbiting satellite.

The basic methods for making the scan fall into two different groups. One—the cross track scan in the $\theta_x$ direction contains the satellite, the sub-satellite point as it intersects the earth along the nadir direction, and the center of the earth, as shown in FIG. 1. The satellite motion provides the scan in the $\theta_y$ direction. The plane of the scan $\theta_x$ is then perpendicular to the satellite velocity vector. The projection of this scan pattern on a spherical earth is the same as that made by the scan pattern $\theta'_x$, $\theta'_y$ centered on the earth where the direction of $\theta'_y$ is along a great circle of the earth in the same plane as the satellite and $\theta'_x$ is perpendicular to $\theta'_y$. For this case, FIG. 4 shows the projection on the earth of the satellite track and the edges of the scan at $\pm \theta'_x/2$ with a chord length 2X.

Two—In this case the scan plane $\theta_x$ is tilted relative to the nadir direction over the range of angles from $-\theta_y/2$ to $+\theta_y/2$ to give a rapid two dimensional scan $\theta_x$ by $\theta_y$. For $\theta_y=0$, the center of $\theta_y$, the projection of the scan on the earth at $\pm\theta_x/2$ corresponds to the chord length 2X in FIG. 1, the same points on the earth as in case 1, since these are identical projections. Also, for $\theta_x=0$, the center of $\theta_x$, the projection of the scan at $\pm\theta_y/2$ corresponds to the chord length 2Y, also the same two points on the earth as in case 1. For all other points, the projection of the edges of this surface on the earth is greater than that given for case 1 and the projection on the earth gives increasingly larger areas as one moves from the center of any given edge to the corner position of that edge. Thus, it follows that for the case of a fast scan, the projection of the scan on the earth has a field of view greater than that of case one.

Figure 5:
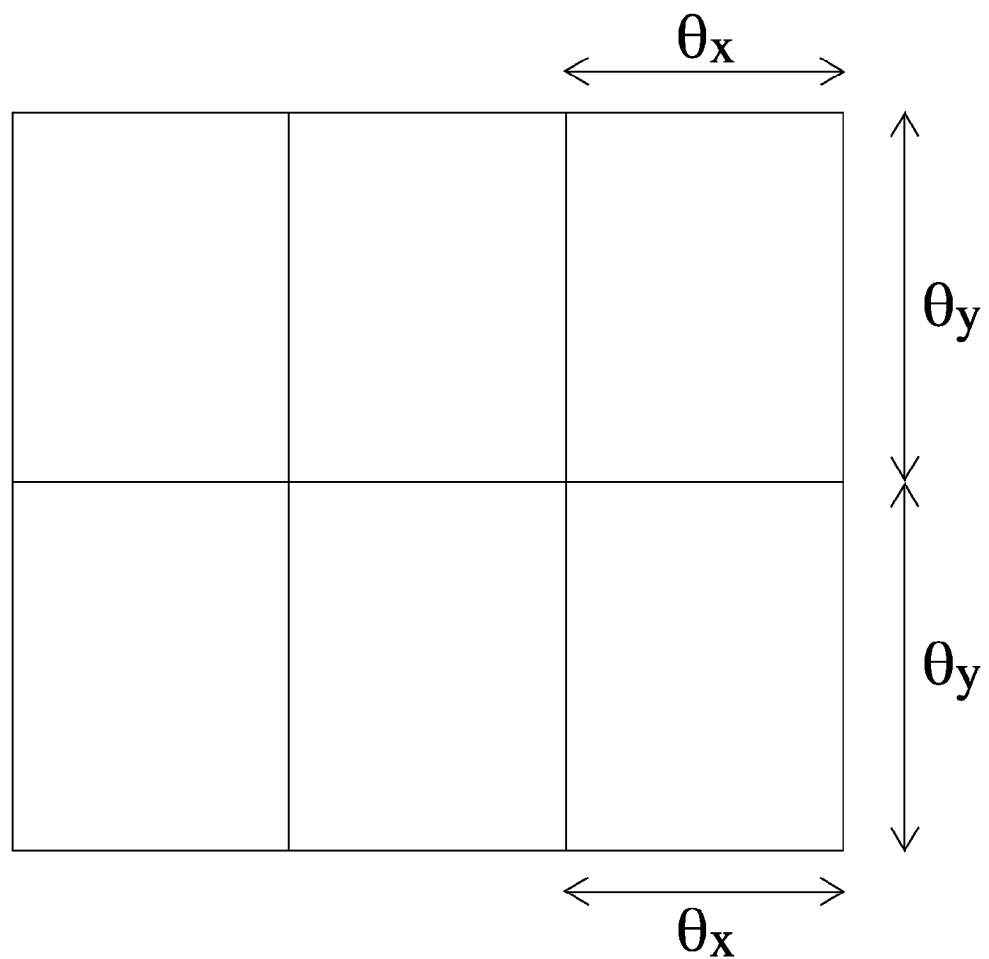
FIG. 5—Contiguous/overlapping areas of size $θ_x$ by $θ_y$ seen by a constellation of satellites scanning a small region near the equator (for small angles $θ'_x$ and $θ'_y$ as seen from the center of the earth).

A constellation of satellites is employed, each scanning contiguous/overlapping areas of size $\theta_x$ by $\theta_y$ over the surface of the earth. FIG. 5 shows a 2D representation of a few of these contiguous areas for a small region near the equator for the case where the angles $\theta'_x$ and $\theta'_y$, corresponding to $\theta_x$ and $\theta_y$, respectively, are small and the scanned areas are approximately rectangular in shape.

Contiguous/overlapping coverage over the earth is obtained as follows for the general case. In the equatorial plane, the satellites are each spaced by an approximate angle $\theta'_x$ $$\theta'_x = 2\sin^{-1}(X/R_0) \quad (1)$$

over at least one-half the equatorial plane where $\theta'_x$ is the angle as seen from the center of the earth (which corresponds to the angle $\theta'$ in FIG. 1) and where $R_0$ is the radius of the earth. The number of measurements needed in the equatorial plane is $$n^*_e = \pi/\theta'_x \quad (2)$$

Figure 6:
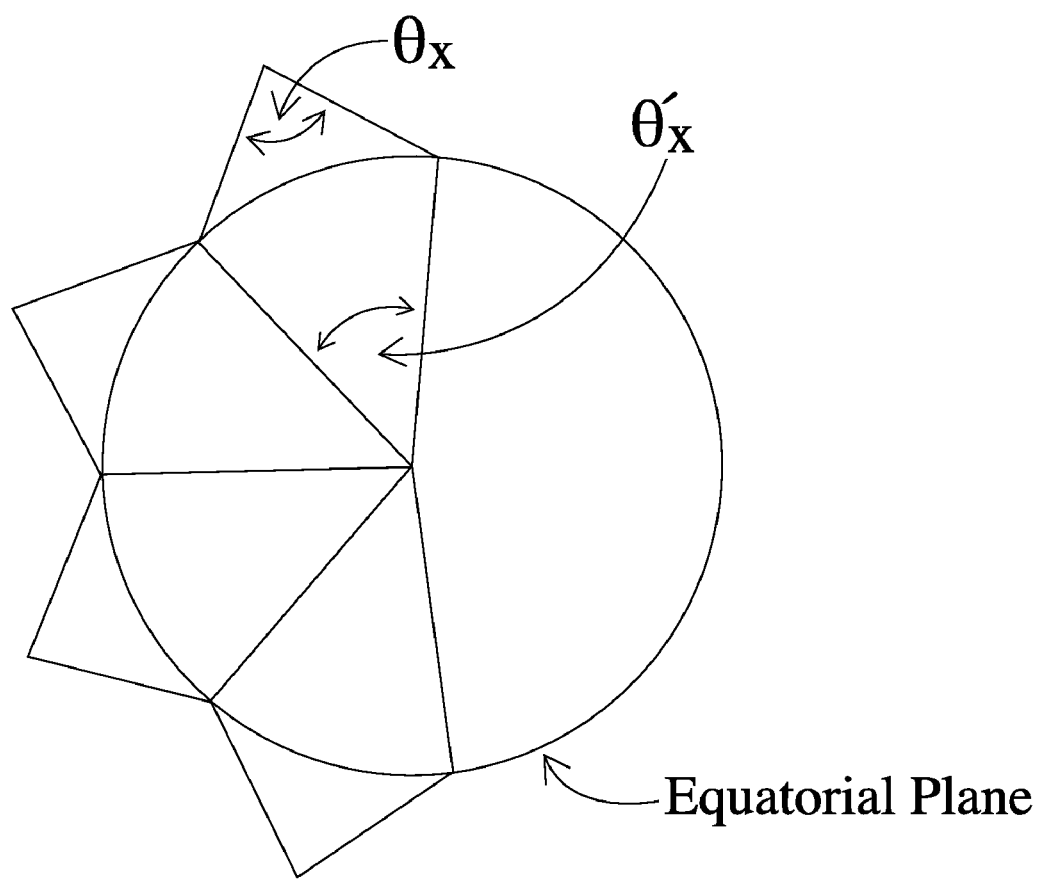
FIG. 6—Four polar satellites scanning slightly more than 180° (π radians) with contiguous coverage as they pass over the equatorial plane.

FIG. 6 shows an example for the case of 4 satellites which gives about 3.7 measurements for the 180° angle used with Eq. (2). $n_e$ is defined as the value of $n^*_e$ rounded up to the next largest integer. This gives the required number of polar planes or equivalently the required number of satellites as they pass through the equatorial plane. For $n_e$ satellites, the angle between satellites for uniform spacing is then given as $$\theta'_x = \pi/n_e \quad (3)$$

Figure 7:
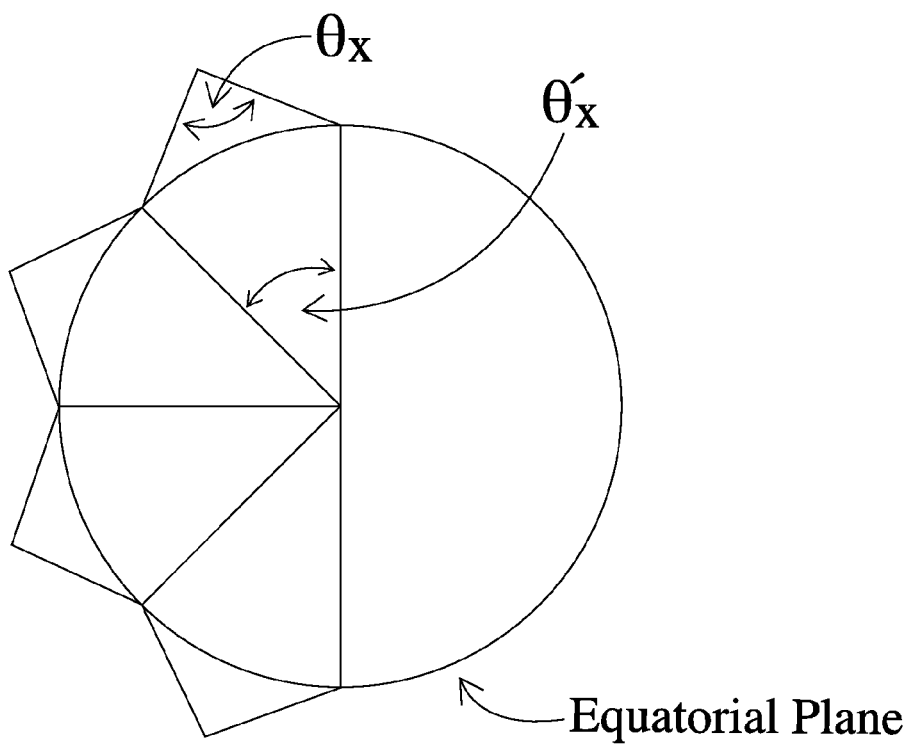
FIG. 7—Four satellites scanning 180° (π radians) with contiguous coverage as they pass over the equatorial plane.

FIG. 7 shows an example for the case of 4 satellites. In each polar plane, the north-south direction, the measurements are approximately spaced by an angle $\theta'_y$ over the whole polar plane where $\theta'_y$ is defined in an analogous manner to $\theta'_x$, with the chord length 2Y replacing 2X in FIG. 1 and Eq. (1). The number of measurements needed in each polar plane is $$n^*_p = 2\pi/\theta'_y \quad (4)$$

$n_p$ is defined as the value of $n^*_p$ rounded up to the next largest integer which gives the required number of satellites in each polar plane. For $n_p$ satellites, the angle between satellites for uniform spacing is $$\theta'_y = 2\pi/n_p \quad (5)$$

The number of satellites needed to obtain contiguous or overlapping coverage over the whole earth's surface is then given as $$n \geq n_e n_p \quad (6)$$

Measurements are only needed over at least one-half of the equatorial plane since the measurements in the polar plane are made over the whole polar plane and as a result fill in the back side of the equatorial plane and the back side of the earth. The angle $\theta'_x$ gives contiguous coverage along the equatorial plane and overlapping coverage for all other latitudinal planes. The angle $\theta'_y$ gives contiguous coverage along the north-south or polar plane direction. Alternately, the measurements in the equatorial plane could be made over the whole plane, $2\pi$, and the measurements in the polar plane could be made over at least one-half that plane, $\pi$.

In practice, the angle $\theta_x$ and $\theta_y$ should be chosen to provide a slightly larger coverage than $\theta'_x$ and $\theta'_y$ to give a small amount of overlapping coverage. This could be used to obtain registration of the images from different satellites using identification of common ground features.

The relationship between $\theta$ and $\theta'$ is specified using a physically based criterion relating these angles. From FIG. 1 it can be shown that the zenith angle, the angle of a measurement at range R with the outgoing normal to the earth's surface is $$\theta_n = \theta/2 + \theta'/2. \quad (6A)$$

Then for any given value of $\theta_n$, e.g., $\theta_n < 68°$ for downward looking measurements where resolution considerations are important or $\theta_n = 90°$ for measurements going out to the horizon, the value of $\theta$ is found from $\theta'$ with Eq. (6A). Also, one may then find the altitude z corresponding to $\theta$ and $\theta'$ from FIG. 1 as $$z = X/\tan(\theta/2) - z_2 \quad (6B)$$

where X is given by Eq. (1) and $z_2 = R_0 - z_1$.

One particularly important type of constellation is the symmetrical constellation $\theta'_x = \theta'_y$. From Eq. (3) the number of polar planes is $$n_e = \pi/\theta' \quad (7A)$$

and from Eqs. (3) and (5) the number of satellites per plane is $$n_p = 2n_e \quad (7B)$$

which from Eq. (6) gives $$n = 2n_e^2. \quad (7C)$$

It should be noted that for $\theta'_x = \theta'_y$ and for the same criterion angle $\theta_n$ for both the $\theta_x$ and $\theta_y$ directions, it follows that $\theta_x = \theta_y$.

The members of the symmetrical constellation may be determined from Eqs. (7A), (7B), and (7C). The first members of the constellation are provided for convenience in Table 1. These are calculated as follows. A value of $n_e$ is first selected, e.g., 2, θ'=90° or π/2 radians is found from Eq. (7A), $n_p$=4 from Eq. (7B), and n=8 from Eq. (7C). As shown in Table 1, the members of the constellation have a particularly simple form for single fold, k=1, continuous global coverage, e.g., 2*4, 3*6, 4*8, etc.

TABLE 1

Symmetrical polar constellations for k-fold continuous full earth single k = 1, double k = 2, triple k = 3, and quadruple k = 4 coverage

| θ'/2 | $n_e$ | k = 1 $n_p$ | k = 2 $n_p$ | k = 3 $n_p$ | k = 4 $n_p$ |
|---|---|---|---|---|---|
| 45 | 2 | 4 | 8 | 12 | 16 |
| 30 | 3 | 6 | 12 | 18 | 24 |
| 22.5 | 4 | 8 | 16 | 24 | 32 |
| 18 | 5 | 10 | 20 | 30 | 40 |
| 15 | 6 | 12 | 24 | 36 | 48 |
| 12.8571 | 7 | 14 | 28 | 42 | 56 |
| 11.25 | 8 | 16 | 32 | 48 | 64 |
| 10 | 9 | 18 | 36 | 54 | 72 |
| 9 | 10 | 20 | 40 | 60 | 80 |
| 8.1818 | 11 | 22 | 44 | 66 | 88 |
| 7.5 | 12 | 24 | 48 | 72 | 96 |
| 6.923 | 13 | 26 | 52 | 78 | 104 |
| 6.4286 | 14 | 28 | 56 | 84 | 112 |
| 6.0 | 15 | 30 | 60 | 90 | 120 |
| 5.625 | 16 | 32 | 64 | 96 | 128 |
| 5.2941 | 17 | 34 | 68 | 102 | 136 |
| 5.0 | 18 | 36 | 72 | 108 | 144 |
| 4.7368 | 19 | 38 | 76 | 114 | 152 |
| 4.5 | 20 | 40 | 80 | 120 | 160 |
| 4.2857 | 21 | 42 | 84 | 126 | 168 |
| 4.0909 | 22 | 44 | 88 | 132 | 176 |
| 3.9130 | 23 | 46 | 92 | 138 | 184 |
| 3.75 | 24 | 48 | 96 | 144 | 192 |
| 3.6 | 25 | 50 | 100 | 150 | 200 |
| 3.4615 | 26 | 52 | | | |
| 3.3333 | 27 | 54 | | | |
| 3.2143 | 28 | 56 | | | |
| 3.0 | 0 | 60 | | | |
| 2.9032 | 31 | 62 | | | |
| 2.8125 | 32 | 64 | | | |
| 2.7273 | 33 | 66 | | | |
| 2.6471 | 34 | 68 | | | |
| 2.5714 | 35 | 70 | | | |

A convenient method of finding the constellation parameters is as follows. Given a value for θ', X and $z_1$ are found from FIG. 1 and $z_2$ is then found from $z_1$ and $R_0$. Then choosing a value for the altitude z, θ is found from Eq. (6B) and $θ_n$ from eq. (6A). Alternatively, given θ', X, $z_1$ and $z_2$ are found as above, a value is selected for $θ_n$, θ is found from Eq. (6A) and the altitude is calculated from Eq. (6B).

Figure 8:
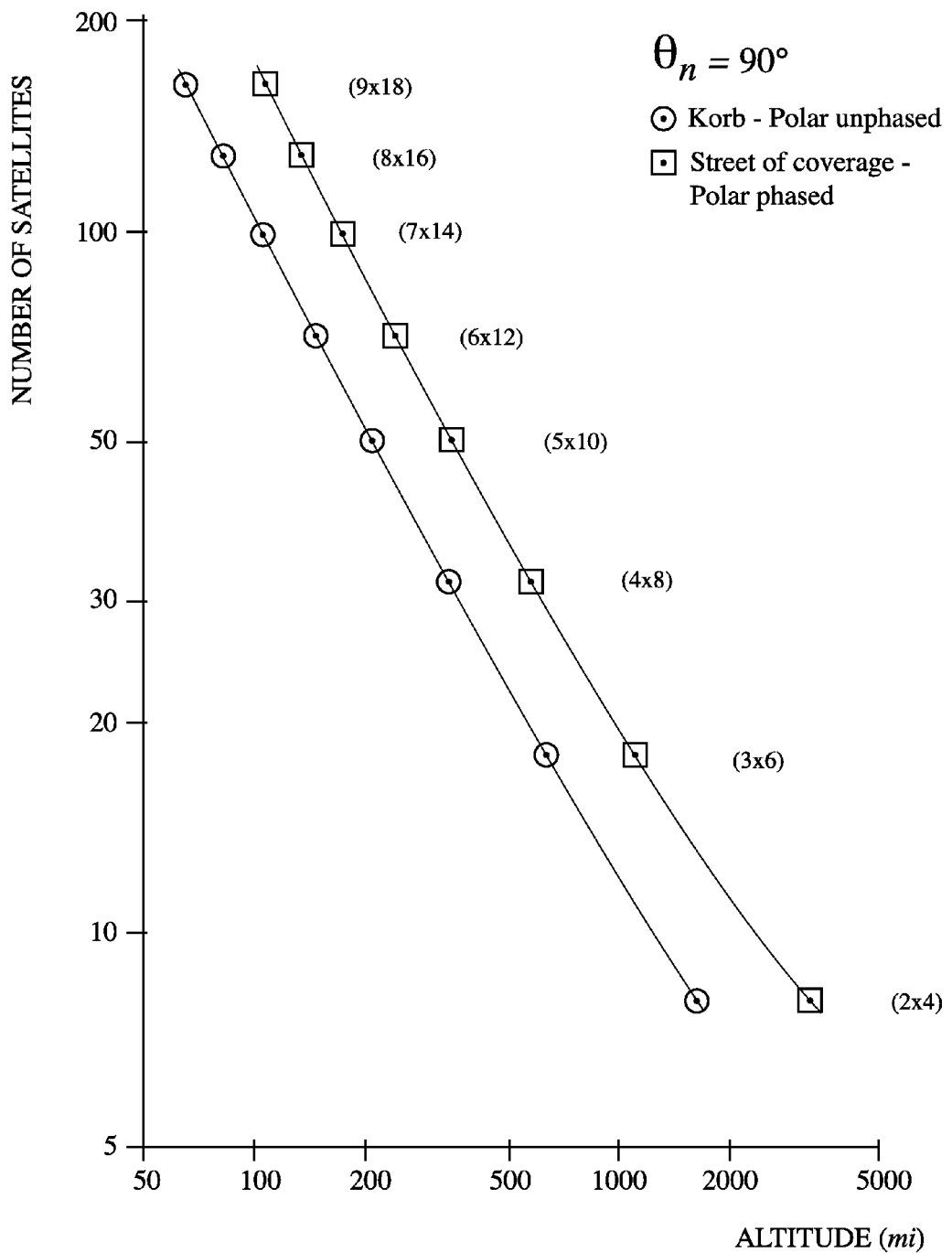
FIG. 8—A comparison of the number of satellites required for contiguous/overlapping coverage of the earth as a function of altitude for a zenith angle of $θ_n$=90° and constellations ($n_e × n_p$) as given here (Korb) and with the streets of coverage method.
Figure 9:
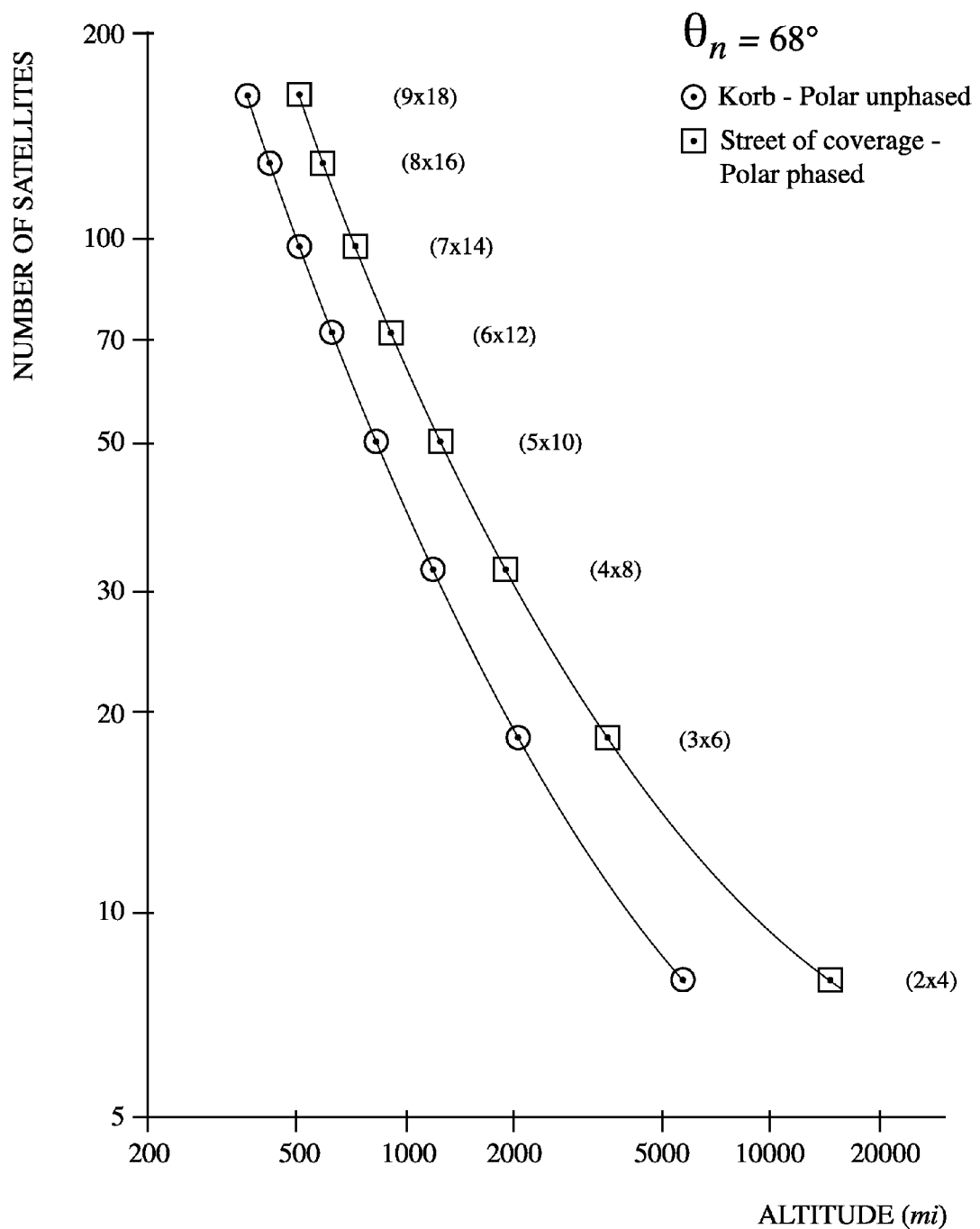
FIG. 9—A comparison of the number of satellites required for contiguous/overlapping coverage of the earth as a function of altitude for a zenith angle of $θ_n$=68° and constellations ($n_e × n_p$) as given here (Korb) and with the streets of coverage method.

FIGS. 8 and 9 show the number of satellites required for continuous, contiguous/overlapping global coverage as a function of altitude for the cases where the scan goes from nadir to a grazing angle of incidence $θ_n$=90° with the edges of the scan for FIG. 8, a horizon scan for communications or missile detection, and from the nadir to $θ_n$=68° for FIG. 9, a downward looking earth based scan, see Eq. (6A). This is for a rapid, continuous scan. For each constellation, the figures also give the number of orbital planes $n_e$ and the number of satellites per orbital plane $n_p$ as ($n_e×n_p$). The constellations shown in FIGS. 8 and 9 using the methods of the present invention are for the symmetrical polar constellations shown in Table 1 and are not optimized for satellite phasing. These results are compared with the work of Rider (1985) who uses optimized polar orbit constellations with optimized satellite phasing using the "streets of coverage" technique for constellation sizes up to approximately 160 satellites for single coverage. As was discussed in the background, this technique uses a conical scan pattern to scan the area within a series of minor circles on a spherical earth which are centered at each sub-satellite point.

FIG. 8 and FIG. 9 show that the constellations designed by the instant invention, are substantially more efficient than the optimal phased polar constellations determined by Rider. Namely, the same coverage can be obtained with the same altitude for constellations designed in accordance with the method of the present invention, with about 40% fewer satellites than that of Rider. In other words, the optimal phased Rider constellations require about 1.6 times as many satellites as the constellations of the present invention. Also, as shown in Rider (1986), his optimal polar phased constellations are significantly more efficient than his polar unphased constellations, about a factor of 1.2, or his optimized inclined orbit constellations. Further, for small constellation sizes of about 25 satellites or less, the inclined orbit constellations of Walker (1977) which use analytical and computer search techniques and constellations where each satellite can have its own orbit plane produce about 10 to 20% more efficient designs for single coverage than those of Rider's optimally phased polar orbits. Then, it follows that the constellations of the present invention provide by far the highest efficiency of those considered for single fold, continuous coverage.

Eqs. (1)-(6) were developed based on contiguous coverage over the whole earth. However, if contiguous/overlapping coverage is only required for latitudes greater than or equal to $±L_0$ rather than everywhere, then this requirement could be met by obtaining contiguous/overlapping coverage over the latitudinal plane $L_0$ instead of the equatorial plane.

In this regard, it should be noted that the scan width for the set of satellites in a polar plane has a corresponding chord length 2X over the whole polar plane, as best shown in FIG. 4. Then for any given latitudinal plane $L_0$, the angle of the chord length 2X as seen from the center of that plane is $$θ'_{L_0} = 2 \sin^{-1}(X/(R_0 \cos L_0)) \quad (7D)$$

for the condition $2X \leq 2R_0 \cos L_0$ where $R_0 \cos L_0$ is the radius of that plane. Continuous, contiguous/overlapping coverage for $L \geq ±L_0$ is then obtained by replacing the angle $θ'_x$ in Eqs. (2) and (3) by the angle $θ'_{L_0}$. For the equatorial plane, $L_0$=0 and Eq. (7D) reduces to Eq. (1). For all other planes, $θ'_{L_0} \geq θ'_x$ and coverage for $L \geq L_0$ can generally be achieved with a smaller number of polar planes $n_e$ and a smaller number of satellites.

One method of finding the constellations for contiguous/overlapping coverage for $L \geq L_0$ is as follows: [1] For the symmetrical constellations $θ'_x = θ'_y$, choose $n_e$, find θ' from Eq. (7A) and $n_p$ from Eq. (7B). [2] Calculate X from Eq. (1). [3] Calculate $θ'_{L_0}$ from Eq. (7D) using X from step 2. [4] Recalculate $n_e$ from Eq. (2) using $θ'_{L_0}$ for $θ'_x$. This gives the constellation parameters $n_e$, $n_p$, and θ'.

Figure 10:
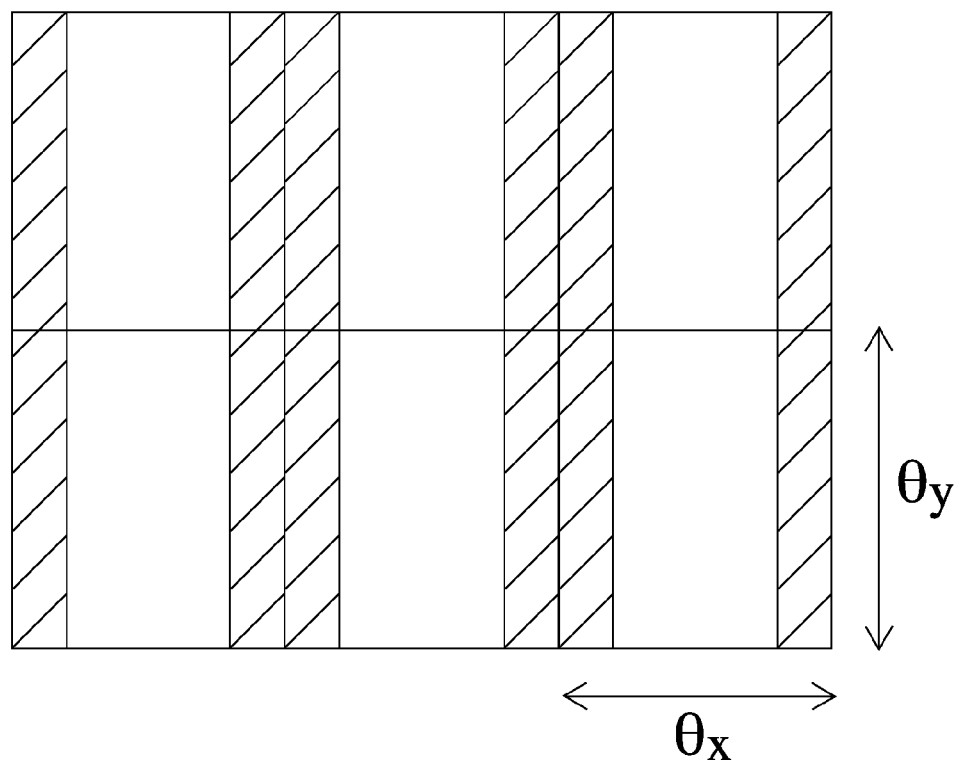
FIG. 10—Contiguous/overlapping areas of size $θ_x$ by $θ_y$ seen by a constellation of satellites scanning a small region at mid-latitudes (for small angles $θ'_x$ and $θ'_y$) where the hatched areas show overlap in the $θ_x$ direction.

FIG. 10 shows a 2D representation of a few of the areas seen by the constellation of satellites for a small region of the earth at mid-latitudes where the angles $θ'_x$ and $θ'_y$ are small. The areas of coverage by adjacent satellites overlap in the $θ_x$ direction which is shown as the hatched-in (crossed) regions with a small tilt angle which is not shown. As the satellites approach the poles, the overlap in the $θ_x$ direction increases and becomes essentially complete at the poles since the orbital tracks for all satellites in the constellation cross at the poles. On the other hand, as the satellites approach the equator, the coverage for the constellation of satellites becomes contiguous as shown in FIG. 5.

For polar orbiting satellites, satellite collisions at the poles must be prevented. This is particularly important for large constellations. This may be addressed by using slightly different altitudes for the satellites in different orbital planes, by using slightly different angular deviations in the orbital track for satellites in different orbital planes so that the satellites in different planes cross the equator at angles which differ slightly from 90°, or by offsetting the times at which satellites in different orbital planes pass through the poles.

Figure 11:
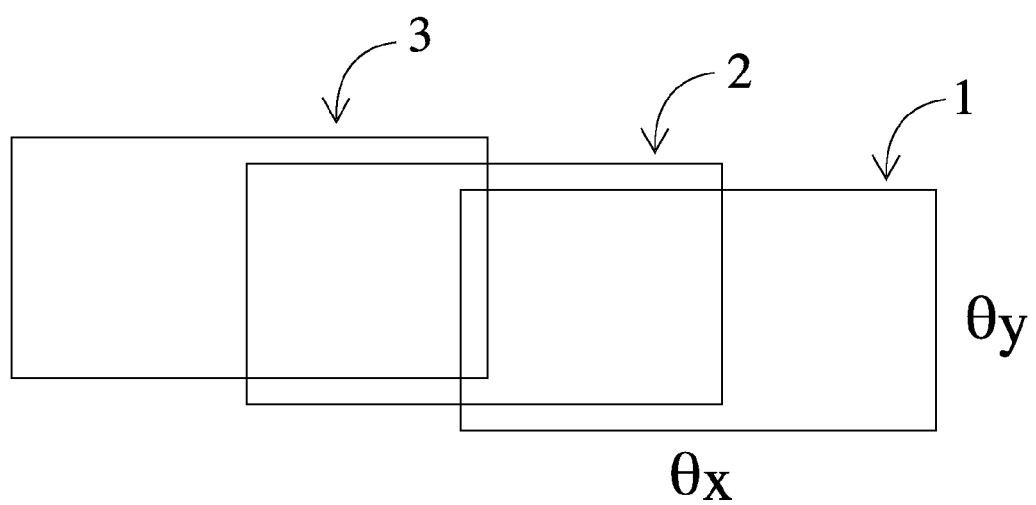
FIG. 11—A factor of two overlap in the $θ_x$ direction gives double coverage for the equatorial plane, shown in 1 dimension for a small region of the equatorial plane for small angles $θ'_x$ and $θ'_y$.

In order to allow the height of any given feature on the earth or in the atmosphere to be determined, every resolution element on the earth must be observed from at least two different vantage points. That is, at least two different views must be obtained. There are two cases. One—the case where the features are relatively stationary terrain features such as trees, buildings, or mountains. Two or more views can be obtained for this case from measurements of the earth built up over a period of time, e.g., days, weeks, or months, providing the satellite orbits do not follow the same ground track. Two—for the case where the features are moving objects (missiles, planes, trains, ships, etc.), two or more views must be obtained at essentially the same time, particularly for objects moving at high velocity. This is done by overlapping the area of coverage for each satellite by a factor of 2 for double coverage, a factor of 3 for triple coverage, or by a factor of k for k-fold redundant coverage in either the equatorial or the polar plane. This is done by increasing either the number of uniformly spaced orbital planes or by increasing the number of satellites per orbital plane by a factor of 2, 3, or k. This same analysis also applies to obtaining single, double, . . . k-fold coverage for all latitudes greater than any given latitude $L_0$ using Eq. (7D). FIG. 11 shows the case of double coverage in the equatorial plane for the case where the angles $\theta'_x$ and $\theta'_y$ are small and where successive coverage areas are shown in one dimension only for clarity of presentation. Then it follows that in order to obtain 3 dimensional global stereo information with k-fold (2, 3, 4, . . . ) redundant coverage for moving objects, the total number of satellites needed is $$n_{3d} \geq k n_e n_p. \quad (8)$$

Table 1, as previously discussed, gives the first 35 members of the symmetrical polar constellations for continuous, contiguous/overlapping global coverage, the case of k-fold coverage with k=1. Table 1 also gives the members of the polar constellations for k-fold (k=2, 3, or 4) redundant, global coverage for the first 25 symmetrical constellations where the value of $n_p$ is increased to provide the desired k-fold coverage. Alternately, the value of $n_p$ could be fixed and the value of $n_e$ could be increased to give the desired coverage.

For k-fold redundant global coverage (k=2, 3, or 4) a comparison of the polar constellations of Table 1 shows they provide considerably higher efficiency, approximately 1.4 times higher or more, than those of Rider (1985) for optimal polar phasing, those of Rider (1985) for polar unphased, or, those of Rider (1986) for optimal inclined constellations. The efficiency of the coverage for k=1 was presented and discussed for FIGS. 8 and 9. Constellations for k-fold, continuous coverage for any latitude greater than a given latitude, $L_0$, can easily be calculated using Eq. (7D). These constellations are substantially more efficient than the corresponding "streets of coverage" constellations given by Rider (1985).

Figure 12A:
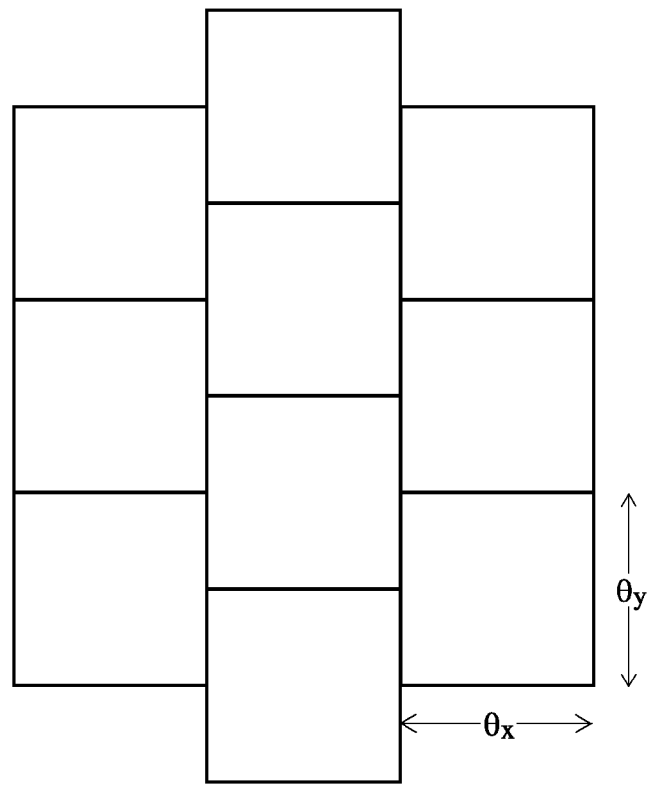
FIG. 12a—A phase shift of one-half the coverage area $θ_x$ by $θ_y$ is shown between each adjacent satellite plane for the $θ_y$, polar, direction.
Figure 12B:
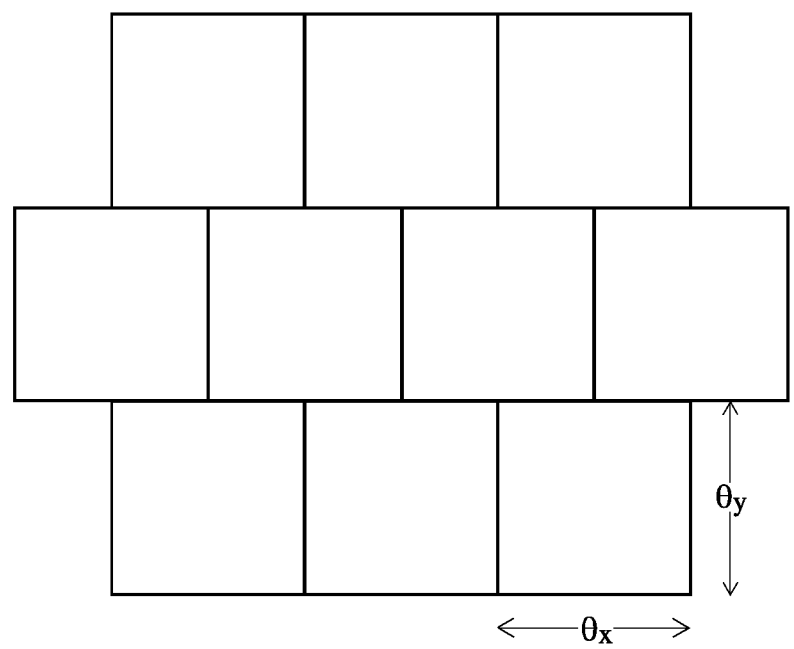

The above analysis, Eqs. (6), (7C), and (8) does not include taking advantage of satellite phasing between adjacent satellite planes. As discussed previously, for a rapid scan the smallest field of view for a given satellite occurs at the center of each edge of the field of view and the largest field of view occurs at the four corners of the field of view. Then, for any given k-fold coverage, k=1, . . . m, the coverage and overlap can be increased and the number of satellites required decreased if in each polar plane the center of the edge of the field of view of each satellite in that ith plane is aligned with a corner of the field of view of the satellites in each adjacent plane i−1, and i+1 (see FIG. 12a). Alternatively, a similar phasing shift can be done in the longitudinal direction by shifting the alignment of every other satellite in the polar direction by an amount equal to one-half of the field of view, with the shift in the longitudinal direction (see FIG. 12b). That is, in the longitudinal direction, the center of the edge of the field of view for each satellite is adjacent to a corner of the field of view for another satellite. This approximately doubles the number of polar planes and decreases the number of satellites per plane by a factor of 2. The effects of satellite phasing are large for small constellations and produce large improvements in coverage.

The frame time T is the time for the sensors on a given satellite to make a measurement over the coverage area for that satellite which corresponds to $\theta_x$ by $\theta_y$. If the satellite coverage areas are contiguous or overlapping over the whole surface of the earth, the frame time corresponds to the time to provide coverage over the entire surface of the earth. There are two cases. One—For the case where the satellite or instrument scan mechanism provides a rapid two dimensional scan, the frame time of the measurement is equal to the scan time and can be made as small as desired, for example, a fraction of a second, dependent only on collecting sufficient signal to allow the desired measurement accuracy and resolution to be obtained. This, however, is generally not the case and there is often not enough signal to obtain the measurement with the desired spatial resolution in a short frame time.

For the second case, the frame time is the time for a satellite to traverse the portion of its orbit corresponding to $\theta'_y$. This gives a maximum value for the frame time. From Eq. (5), the time to provide complete earth coverage, the satellite revisit time $T_R$, is $$T_R = T_{orb}/n_p \quad (9A)$$

where $T_{orb}$ is the satellite orbital period for altitude z. The revisit time found from Eq. (9A) corresponds to the time available for the satellite motion to provide the scan in the along track direction over the angle $2\pi/n_p$. For a low altitude satellite, the satellite orbital period is of the order of 90 minutes. Then for a value of $n_p$ of 20, the frame time is of the order of 4.5 minutes.

From Eq. (7C), the number of satellites required to get continuous, contiguous or overlapping coverage over the earth is quite large. For example, for a value of $n_e$ of 5, 50 satellites are required and for a value of $n_e$ of 10, 200 satellites are required. This method along with the use of a rapid 2D scan allows semi-continuous measurements, e.g., of the order a fraction of a second to be obtained.

This work can also be used to develop partial satellite constellations which give non-contiguous coverage. In this case, for a given value of $n_e$, $n_p$ can take on the value of 1, 2, . . . $2n_e−1$ rather than the value of $n_p=2n$, for a full (symmetric) constellation, see Eq. (7B). This gives rise to a whole set of partial constellations, one for each value of $n_p$, which provide coverage with a small number of satellites with revisit times as given below. For the case where the satellite motion provides the scan in the along track direction, the revisit time is the time to cover the angular spacing between satellites, $2\pi/n_p$, and is given by Eq. (9A). This is generally a maximum value for the revisit time for a partial constellation. On the other hand, for a fast scan system over the along track satellite field of view $\theta'_y$, the minimum satellite revisit time, also called the satellite access time, is $$T_R(\min) = \left(\frac{1}{n_p} - \frac{\theta'_y}{2\pi}\right)(T_{orb}) \quad (9B)$$

This corresponds to the time to scan the angular separation between satellites minus the time to scan $\theta'_y$. For the case of a full constellation, Eq. (5), and a fast scan system, Eq. (9B) reduces to $T_R(\min)=0$ as required. On the other hand, for the case where the satellite motion provides the scan, the revisit time has a maximum value and is given by Eq. (9A). In order to take a conservative approach, the maximum value for the revisit time, Eq. (9A), will be used for the revisit time unless otherwise stated.

As will be later shown, partial constellations have particularly important applications for improving the revisit time of high performance low altitude satellites. In addition, they can also be used to replace high altitude geosynchronous satellites.

Figure 13:
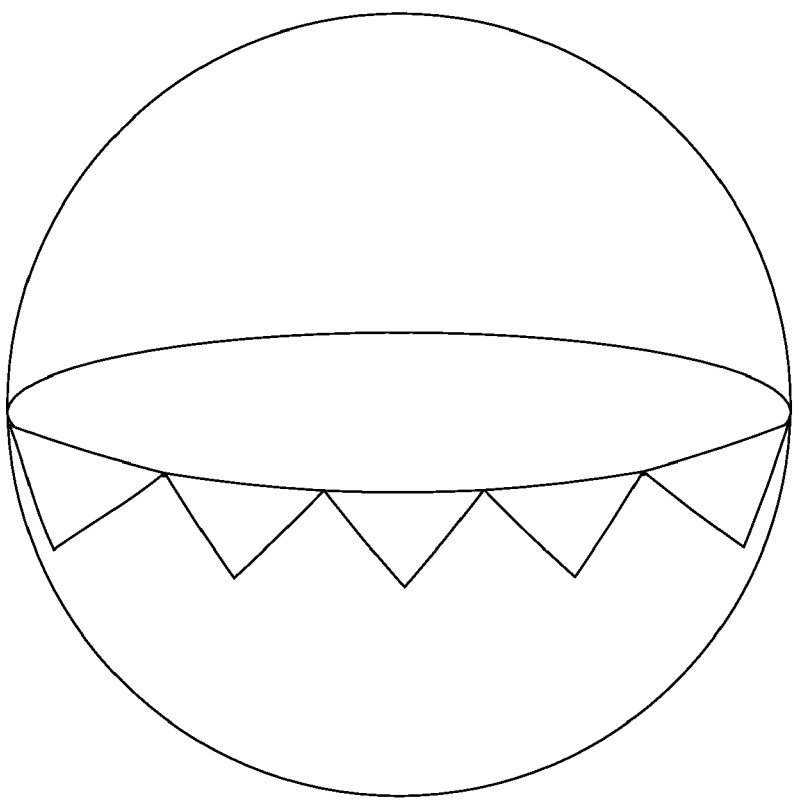
FIG. 13—A partial constellation of 5 polar orbiting satellites is shown crossing the equatorial plane which gives contiguous/overlapping full earth coverage in a time of one orbital period.

One example of a set of partial constellations is for a value of $n_p$ of one where, from Eq. (6) there will be a total of $$n \geq n_e \qquad (10)$$

satellites and the revisit time will be $T_R = T_{orb}$. This is a fundamentally different way of making a measurement with a much smaller number of satellites. For a constellation with a value of $n_e$ of 10, the number of satellites required for full earth coverage from Eq. (10) is only 10, whereas for a fast scan Eq. (7C) requires 200 satellites for this case. Eq. (10) is one limiting case for $n_p = 1$ and gives the minimum number of satellites needed for complete coverage of the earth with a revisit time equal to the satellite orbital period, $T_{orb}$. For this configuration, the $n_e$ satellites are polar orbiting satellites with an angular spacing of $\theta'_x$ in the equatorial plane. FIG. 13 shows the case of 5 satellites as they cross the equatorial plane providing full earth coverage in a time $T_{orb}$.

To obtain the desired revisit time, Eq. (9A) is used with an appropriate integer value of $n_p$. Eq. (6) then gives the number of satellites required. For example, for a value of $n_p$ of 10, the number of satellites is $10n_e$ and the revisit time is $T_{orb}/10$. For applications which require a fast semi-continuous revisit time, a value of $n_p$ approximately equal to $2n_e$ is chosen. On the other hand, for applications which require the highest resolution and for which a frame time of the order of the orbital period is sufficient, one could choose $n_p$ to be of the order of one or two and minimize the number of satellites which are needed.

Figure 14A:
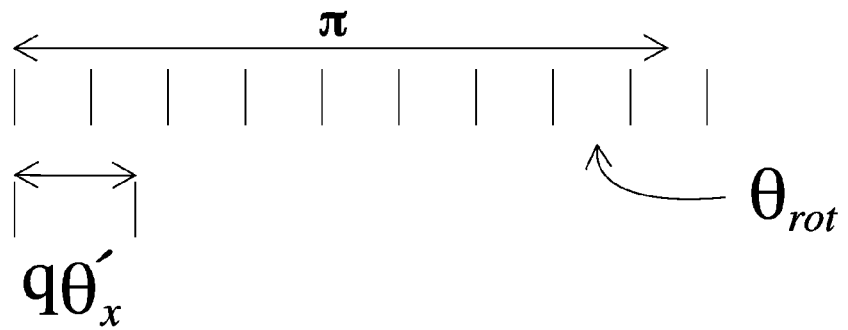
FIG. 14a—A set of q satellites with an angular coverage $qθ'_x$ greater than or equal to $θ_{rot}$, the earth's angular rotation at the equator in the time for one satellite orbit, is shown for a 1D linear view of the equatorial plane.
Figure 14B:
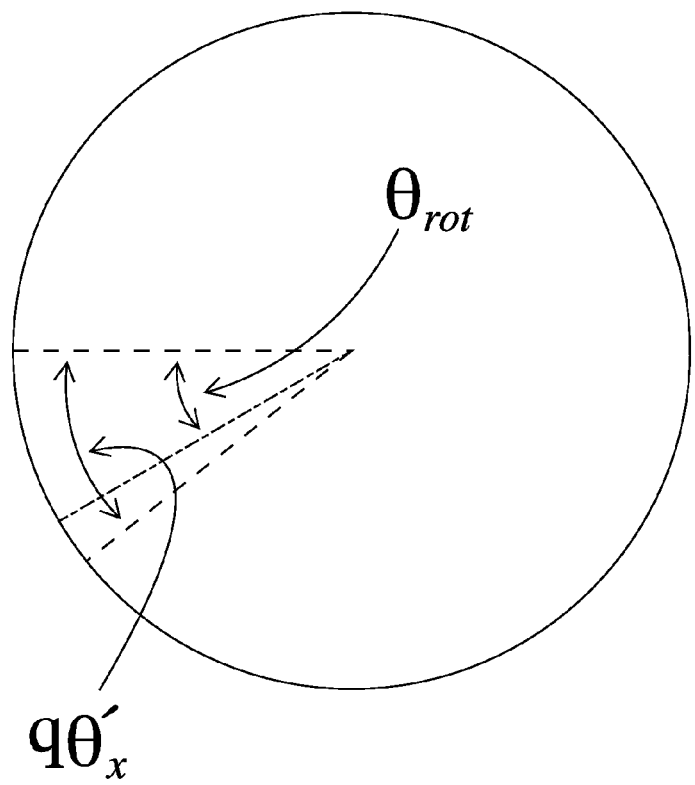

Another orbital configuration is the case of q satellites which have individual coverage areas which are contiguous or overlapping with a combined angular coverage width of $q\theta'_x$ in the equatorial plane, as seen from the center of the earth. Then, if the coverage width, $q\theta'_x$, is greater than or equal to the earth's angular rotation at the equator, $\theta_{rot}$, in the time for one satellite orbit (see FIG. 14a which shows a 1D, simplified linear view of the equatorial plane, and FIG. 14b which shows a 2D view), full earth coverage is obtained in the number of orbits required to cover at least one-half of the earth's circumference at the equator. That is, the number of orbits is equal to $\pi/\theta_{rot}$ rounded up to the next largest integer. Also, the number of orbits for full earth coverage can be reduced using multiple sets of q satellites. For example, for the case of an orbit with an altitude of approximately 200 km, 124.3 mi, full earth coverage can be obtained with 1 set of 4 satellites in approximately 8 orbits for an orbital period of 90 minutes, or slightly longer, or in approximately 9 orbits for an orbital period of slightly less than 90 minutes. This case of 4 satellites compares with approximately 28 satellites in the configuration considered by Eq. (10) or with 1568 satellites in the configuration considered by Eq. (6) (see Table 2). For the case of low altitude satellites where the measurements are very high performance and the satellites are very high cost, this method provides a powerful new capability.

Figure 15:
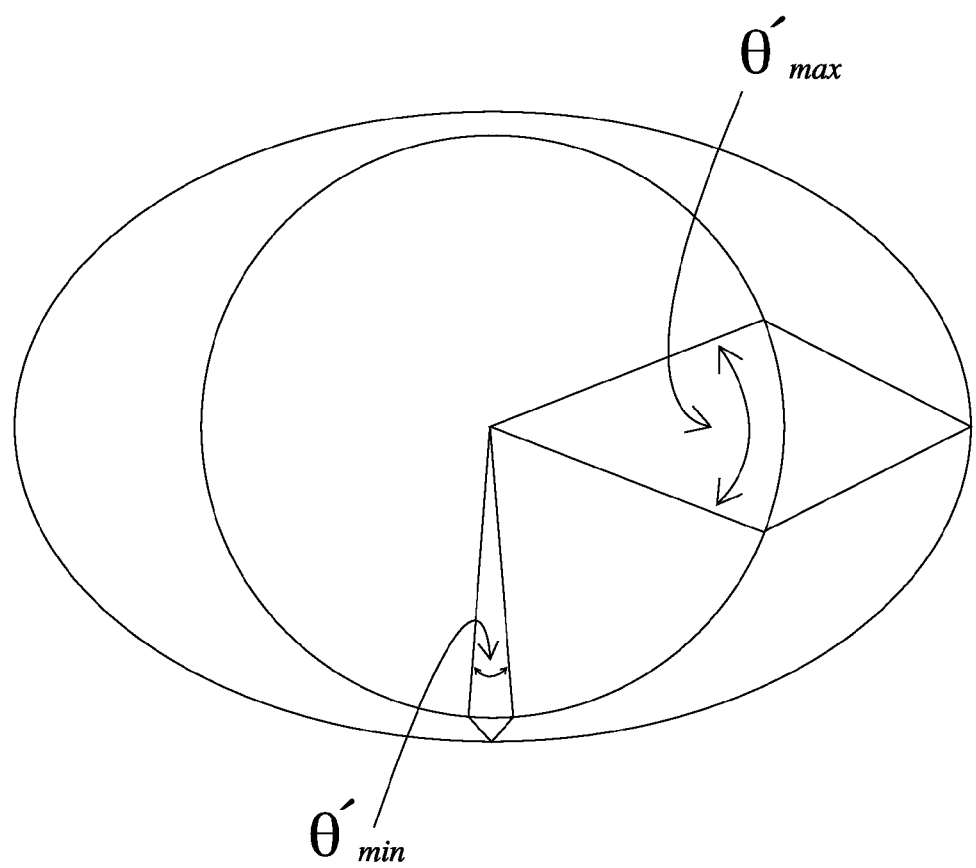
FIG. 15—A given satellite angular coverage for an elliptical orbit produces a small (effective) angular coverage $θ'_{min}$ at the minimum altitude of the orbit and a large (effective) angular coverage $θ'_{max}$ at the maximum altitude of the orbit.

These methods apply to the case of circular polar satellite orbits. They can be extended directly to elliptical polar orbits as well as to both circular and elliptical non-polar orbits. For elliptical polar orbits, contiguous or overlapping coverage over the earth is obtained by making the coverage between adjacent satellites in the equatorial and polar planes contiguous, or overlapping, see Eqs. (1)-(8), where the angles $\theta'$ now generally correspond to the location of minimum coverage in the elliptical orbit $\theta'_{min}$, which also corresponds to the location of minimum altitude for the elliptical orbit (see FIG. 15).

Figure 16:
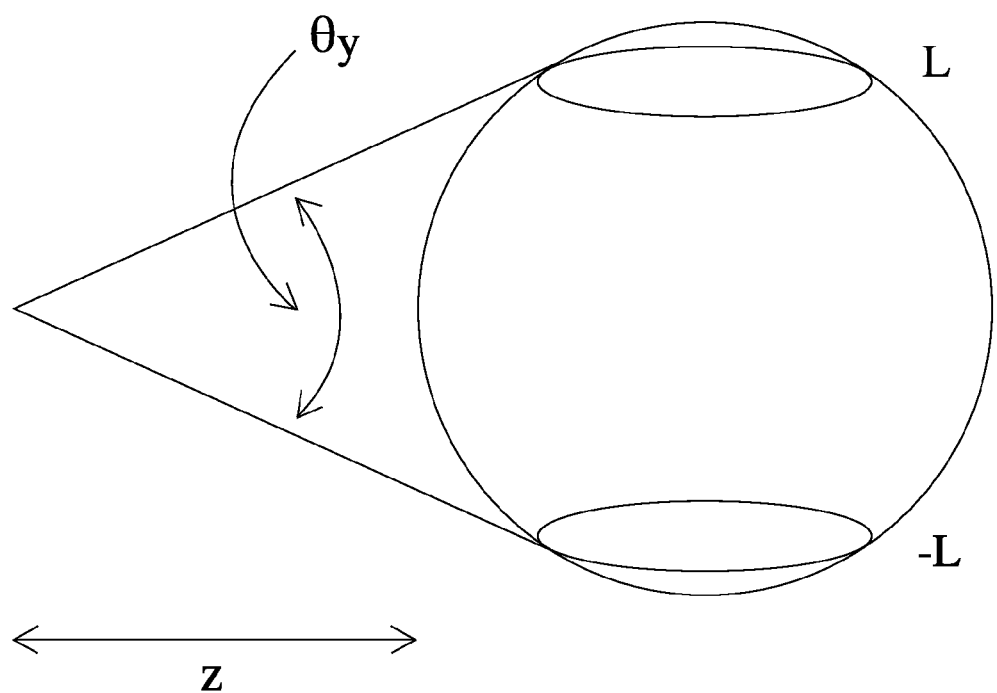
FIG. 16—The latitudinal coverage −L to L for an equatorial orbit depends on the satellite's angular coverage $θ_y$ and the altitude of the orbit.
Figure 17A:
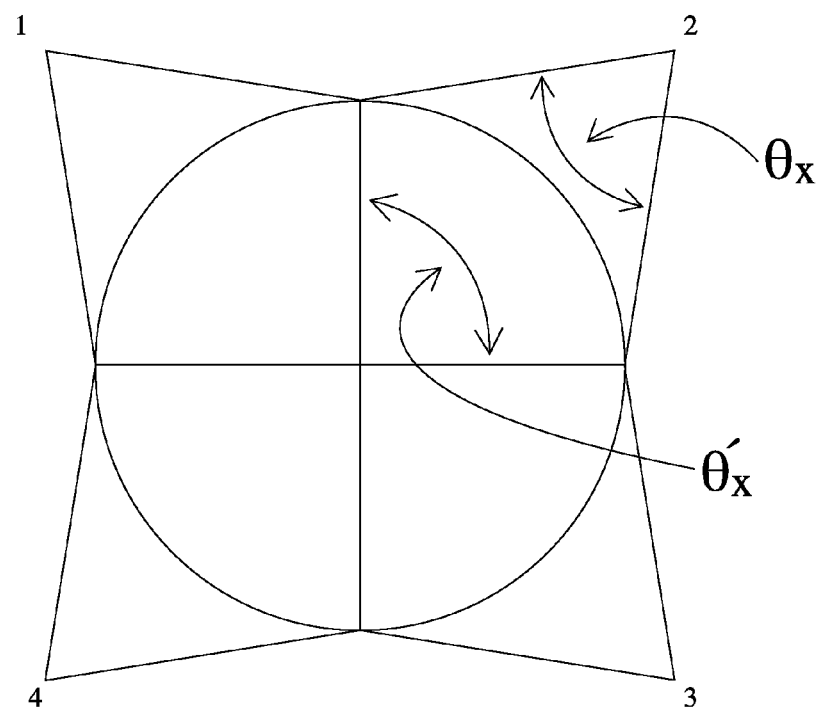
Figure 17B:
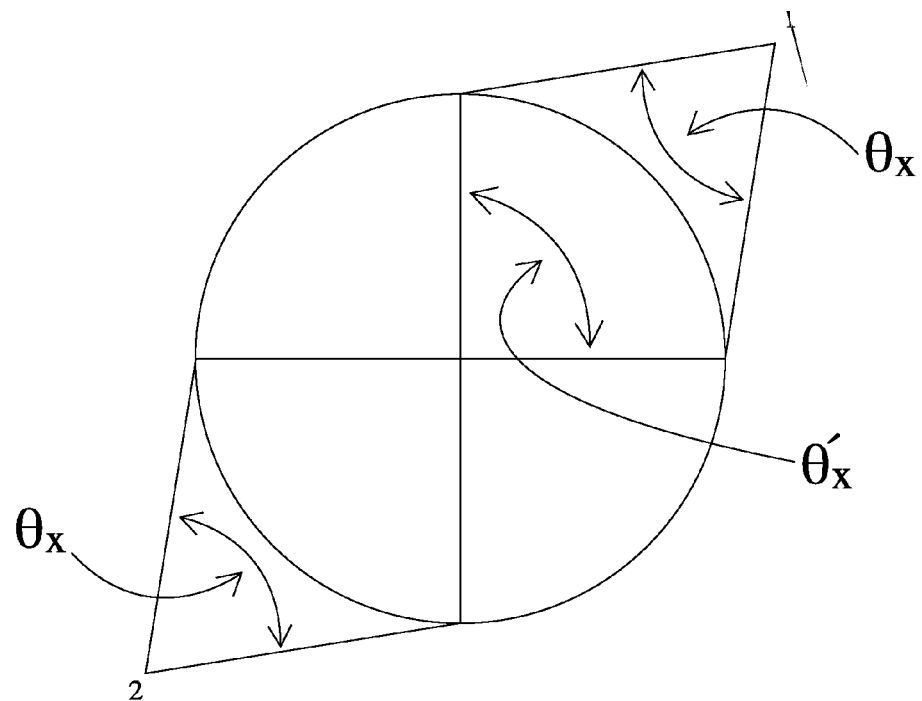

These methods also apply to constellations of circular or elliptical equatorial orbits. This allows contiguous or overlapping coverage over that part of the earth's surface for the range of latitudes L from $-L$ in the southern hemisphere to $+L$ in the northern hemisphere. The value of L depends on the satellite altitude and the satellite's angular coverage $\theta_y$. FIG. 16 shows the latitudinal planes $+L$ and $-L$ and the angle $\theta_y$ for an equatorial orbit. There are two cases—One, contiguous or overlapping coverage between $-L$ and $L$ can be obtained in the frame time T if the spacing between adjacent satellite coverage areas in the equatorial plane is less than or equal to the size of the coverage area in that plane. This requires only a small number of satellites n. FIG. 17a shows this case for 4 satellites providing contiguous coverage over the equatorial plane. Two, for m equally spaced satellites along the equatorial plane, where m is less than n, we can get complete coverage from latitude $-L$ to L over the earth's surface in a time equal to the orbital period divided by m. This requires only a small number of satellites relative to the preceding case, case one. FIG. 17b shows this case for two satellites.

Figure 18:
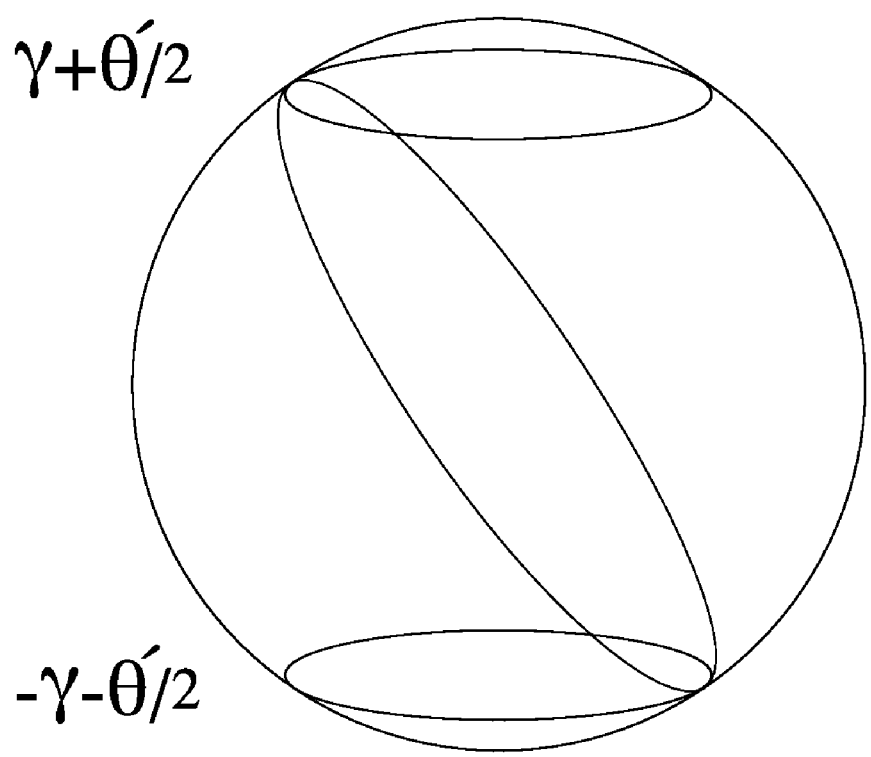
FIG. 18—An inclined satellite orbit that makes an angle γ with the equatorial plane provides coverage of the earth from —γ−θ'/2 to γ+θ'/2.
Figure 19:
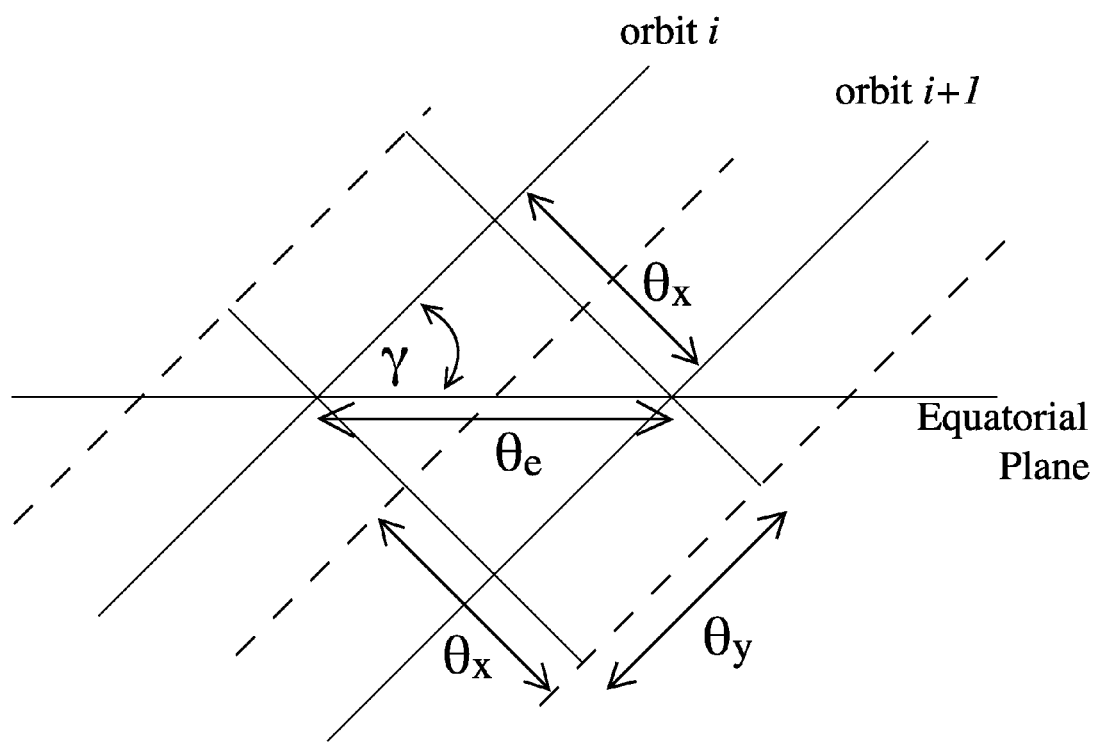
FIG. 19—A 2D projection of the view on the equatorial plane is shown for a satellite with an inclined orbit that makes an angle γ with the equatorial plane and which has a cross track scan angle $θ_x$ and an orbit spacing $θ_e$ (for small angles $θ'_e$).

These methods also apply to constellations of circular or elliptical orbits that make an angle $\gamma$ with the equatorial plane. This allows contiguous or overlapping coverage over that part of the earth from approximately $-\gamma - \theta'/2$ to $\gamma + \theta'/2$, see FIG. 18, where $\theta'/2$ is the projection of the satellite's angular coverage in the polar direction at the maximum (or minimum) latitude of the satellite's orbit. This could allow complete coverage of the earth for an appropriate choice of $\gamma$ and $\theta'$. There are two cases. One, contiguous or overlapping coverage can be obtained from $-\gamma - \theta'/2$ to $\gamma + \theta'/2$ in the frame time T using methods similar to those previously described for polar orbits. In this case, $\theta_y$ is the direction of the satellite as it makes an angle $\gamma$ with the equatorial plane and $\theta_x$ is the scan direction perpendicular to $\theta_y$, see FIG. 19. The number of satellites is the number of satellites per orbital plane $n_p$ as previously given, see Eq. (5), times the number of orbital planes. The number of orbital planes is given as $n_e = \pi/\theta'_e$ where $\theta'_e$ is the angle of the orbit spacing on the equatorial plane as seen from the center of the earth and $n_e$ is rounded up to an integer value. From the law of sine's for spherical triangles, $\theta'^e$ is found as $\theta'_e = \sin^{-1}[\sin(2X/R_0)/\sin\gamma]$ for values of the $\sin\theta'_e \leq 1$. For small values of $2X/R_0$, $\sin\theta'_e \simeq (2X/R_0)/\sin\gamma$. This is illustrated in FIG. 19 for a 2D view for small angles $\theta'_e$. Two, coverage from $-\gamma - \theta'/2$ to $\gamma + \theta'/2$ can be obtained with m satellites per orbital plane, where m is an integer from 1 to $n_p - 1$, in a time equal to the orbit time divided by m. The full and partial constellations given here are very efficient for $\gamma$ much less than 90°.

These methods also apply to the case where the constellation of orbits for circular or elliptical polar orbiting satellites are rotated by an angle $\Phi$ (e.g., 90°) about the polar axis such that the former north and south poles of the constellation make an angle $90° - \Phi$ with the equatorial plane. The two cases that occur with this configuration were discussed above for polar orbiting satellites.

As discussed previously, k-fold continuous stereo coverage of the entire earth or coverage above any selected latitudinal plane can also be obtained for all these cases.

An ultra-high performance measurement can be made in any given area of the earth for a low or intermediate altitude satellite, LMAS, system as follows. The selected area with a size that corresponds to $\theta''_x$ by $\theta''_y$, smaller than the coverage area $\theta_x$ by $\theta_y$, is acquired and scanned by a given satellite when that area first appears in a portion of the area being scanned, see FIG. 20. The coverage continues until the satellite leaves the coverage area $\theta_x$ by $\theta_y$. As coverage of the selected area of interest ends from a given satellite (or multiple satellites if required), coverage of the area of interest begins from the following satellite (or multiple satellites). This process provides continuous coverage of the area of interest from successive satellites until the coverage is stopped. The selected area can be scanned with a 2 dimensional scanning system with image motion compensation in a frame time T' which is a fraction of the full frame time. For a system with n satellites, up to n ultra-high performance measurements of areas of interest could be made simultaneously, one measurement for each satellite. Also, if required, one or more ultra high performance measurements could be made by a given satellite within the area $\theta_x$ by $\theta_y$ using a step scan system. The ultra-high performance system is able to take advantage of all the features of a given LMAS system, and has the advantage that it only has to scan a small fraction of the area of a given system.

The only loss of coverage from using the ultra-high performance feature is in the single area $\theta_x$ by $\theta_y$ containing the feature of interest. For an LMAS system with 200 satellites, this would result in a loss of coverage of the order of 1/200 or 0.5% of the coverage of the earth. In contrast, the use of a zoom type feature for a 3 satellite GS system would result in a loss of 1/3 of the data over the earth which severely limits the use of this feature. Also, an LMAS system has a lower altitude than a GS system. This allows a much higher diffraction limited resolution than a GS system, e.g., more than 100 times higher resolution for a 200 km altitude LMAS system and the same diameter telescopes. These features will be discussed later and presented with numerical examples.

The ultra-high performance system allows an essentially continuous observation of a given area with frame time T' which is a real time capability that can be called on demand. For example, the ultra-high performance scan pattern over any particular small region, for example, a 50 mile by 75 mile region in China or the polar region, could be set and begin to be utilized using pre-programmed methods in a matter of seconds. This would provide ultra-high performance, essentially continuous, real time images of the particular area of interest, much like a movie for a single spectral band or for any combination of spectral bands. This capability would provide information that could not easily be acquired any other way. For example, even if one launched a special satellite to attempt to provide this information, measurements of the particular area of interest might be acquired only once per week or once per several days versus essentially continuous observations.

Variations of constellation designs herein disclosed can be used separately or together in a large number of ways to accomplish different objectives. For example, polar satellite constellations can be used to provide full earth k-fold contiguous/overlapping coverage in the frame time T, e.g., in times of a fraction of a second. However, if k-fold contiguous/overlapping coverage is only required for latitudes greater than $\pm L_0$, then this requirement could be met using the method of Eq. (7D). Alternately, one could use a small constellation of equatorial satellites to supplement the data from this case. This could provide k-fold continuous, contiguous/overlapping data for latitudes 0 to $L_0$ from the equatorial satellite constellation which could be used with the k-fold continuous polar constellation data for $L \geq L_0$ to provide k-fold continuous coverage over the earth.

On the other hand, (if k-fold coverage in the polar region and at high latitudes is not a priority requirement), one can use a constellation of satellites with orbits inclined at an angle $\gamma$ to the equatorial plane. As previously described, this gives contiguous/overlapping coverage in the frame time T from—$\gamma$−$\theta'/2$ to $\gamma+\theta'/2$ and also gives high density overlapping coverage in the region of the latitudinal planes $\gamma \pm \theta'/2$ and $-\gamma \pm \theta'/2$.

If k-fold contiguous/overlapping coverage of the earth in the frame time T is only required in a given latitudinal band in the Northern and Southern Hemisphere, this can be achieved as follows. The design of the constellation of satellites with orbits inclined at an angle $\gamma$ to the equatorial plane is chosen to give k-fold contiguous/overlapping coverage over the latitudinal plane $L_0$, instead of the equatorial plane. This gives k-fold contiguous/overlapping coverage for the latitudinal band $L_0 \leq L \leq \gamma+\theta'/2$ in the Northern Hemisphere and the corresponding latitudinal band in the Southern Hemisphere.

The methods disclosed herein may be employed to image the whole earth or portions thereof from satellites with high spatial resolution with one or more sensors in a short frame time which can produce high data rates. On-board data compression or analysis techniques may be required to reduce the data rate because of bandwidth limitations in transmitting data from satellites to earth-based data receiving stations. The data rate may also be reduced by transmitting data only for particular areas of the earth, for selected time periods, or for data with selected properties, such as particular altitudes, velocities, or spectral properties. For example, if the user's interest was in detecting areas with a particular velocity or altitude range, then the data could be processed on board to determine those areas, and only the data which met the particular altitude or velocity criteria would be transmitted to earth based data receiving stations.

For a full constellation of satellites, an LMAS system has the capability of providing a very high data rate satellite to ground communication system. This occurs since a full LMAS constellation provides contiguous or overlapping coverage of the entire earth. As a result, it has a direct line of sight with every point on the earth at all times and thus can see every earth based data receiving station. If in addition, the angles $\theta_n$, see Eq. (6A), for each satellite are chosen such that $\theta_n \leq 90°$ at the mid-point between adjacent satellites, then there is also a direct line of sight between adjacent satellites. Every satellite can then see at least 3 other satellites. Data can then be transferred between satellites, as needed, and from there to the ground using the entire set of ground based receiving stations.

A full constellation LMAS system also provides a powerful generalized high data rate communications system. This system could directly receive data from and transmit data to a small, low power, mobile (or stationary) cell phone transmitting and receiving station for a given area or even directly to individual cell phone units. Theses are important new capabilities. This system would use the direct line of sight of the LMAS system with every point of the earth for receiving cellular calls from the earth. It would use the direct line of sight between adjacent satellites to transfer calls from a given receiving satellite to the appropriate transmitting satellite with a line of sight view of the receiving cell phone area. It would then transfer the call to the receiving cell phone. An LMAS system has a very low altitude compared to a conventional geosynchronous or low altitude communications system. As a result, it has a signal advantage compared to a conventional system equal to the ratio of the squares of the slant paths from the ground transmitter to the receiving satellite for the two paths. For an LMAS system with an altitude of 250 mi or 124 mi, this corresponds to a signal advantage versus a GS system of approximately 8,000 or 32,000 times for the nadir direction. For an LMAS system at 124 mi vs. a system at 500 mi altitude, this corresponds to a signal advantage of approximately 16 times.

Performance Evaluation

Instrument performance models are developed for both active and passive satellite systems for the general case where the noise is contained within the signal and also for the case where the noise is independent of the signal. Cost models are developed which relate the instrument performance parameters, the constellation size, and the system cost. The cost models are combined with the performance and the constellation models and are applied to the problem of improving the performance of geosynchronous satellite systems and also high performance low altitude satellite systems. The cases of both signal limited and diffraction limited performance are treated.

The performance and cost models developed here generally use ratio techniques. This allows the performance and cost of systems using the methods given here to be directly compared with the performance and cost of current systems. Thus, the user of these methods can use his past and current performance and cost information to directly determine the cost and performance of systems using the methods given here.

The ratio technique given here for comparing the performance of satellite instruments at different altitudes also minimizes the effects of the atmosphere on the comparison. To further reduce the effects of the atmosphere, measurements are compared at two altitudes for the same angular path through the atmosphere. In this case, the atmospheric effects on the measurement, that is, the effects of atmospheric transmission, scattering losses, and path radiance, cancel to first order. To obtain the same atmospheric path from the scene to the satellite, the angle of that path relative to the normal to the earth's surface, $\theta_n = (\theta + \theta')/2$, must be the same for the two measurements, although the individual angles $\theta$ and $\theta'$ may be quite different for the two measurements. Also, in the solar reflected region, the angle of the sun relative to the normal to the earth's surface on the incoming path from the sun to the scene should be the same for the two measurements. These conditions are met approximately for the comparisons set forth herein at the nadir and at the edge of the scan.

1. Signal (Signal to Noise) Limited Performance—Geosynchronous and High Altitude Satellites For a passive instrument observing a scene of radiance L, either solar reflected/scattered radiation or thermally emitted radiation, the signal S collected by the receiver in terms of energy is $$S \propto A_c \beta^2 \Delta t \quad (11)$$

where $A_c$ is the collector area, $\beta$ is the angular resolution of the instrument, and $\Delta t$ is the measurement time per resolution element. Now $\beta$ is given as $$\beta = d \cos^{1/2}\theta_n / R \quad (12)$$

where d is the size of the resolution element projected on the earth, R is the distance, the slant range, from the receiver to the spatial element being measured and $\theta_n$ is the zenith angle between the outgoing normal to the earth and R. It is noted that $\beta = d/R$ for $\theta_n = 0$. Then, the ratio of the angular resolution for altitude z, $\beta_z$, and that for GS orbit, $\beta_g$, where the subscript g designates GS orbit is $$\frac{\beta_z}{\beta_g} = \frac{d_z}{d_g} \frac{R_g}{R_z} \sqrt{A} \quad (13)$$

where $$A = \cos\theta_{n_z} / \cos\theta_{n_g} \quad (13A).$$

The subscript g could also generally be used to designate any other altitude z.

For a measurement area corresponding to the angular field of view $\theta_x$ in one direction and $\theta_y$ in the other direction, the number of resolution elements corresponding to the angular field $\theta_x$ is $$n_x = \theta_x / \beta \quad (14)$$

which is the angular field divided by the angular resolution for one resolution element. Similarly, for $\theta_y$, the number of resolution elements is $$n_y = \theta_y / \beta \quad (15)$$

which is the angular field divided by the angular resolution per element or alternatively the angular field divided by the angular resolution per line which gives the number of lines in $\theta_y$. Then the number of resolution elements $n_s$ in the coverage area $\theta_x$ by $\theta_y$ is $$n_s = \theta_x \theta_y / \beta^2 \quad (16)$$

If this measurement is made in the frame time T, the time to measure the region $\theta_x$ by $\theta_y$, then the measurement time per resolution element for a single detector is $$\Delta t = T / n_s \quad (17)$$

$$\simeq \frac{T\beta^2}{\theta_x \theta_y}$$

The same detector or detector array, in terms of the number of elements, is used for measurements from different orbits, that is for altitude z and for GS orbit. The detector for each system then provides the same advantages so that the detector or detector array does not give either system any inherent advantage. For a detector array which has a size of p by q' elements and which is used optimally then the total time available for each measurement will be increased by a factor pq' and $$\Delta t \simeq pq' \frac{T\beta^2}{\theta_x \theta_y} \quad (18)$$

If the field of view of the detector array is $\leq \theta_x$ by $\theta_y$ for altitudes z and g, then for measurements with the same array size and frame time with $$\frac{\Delta t_z}{\Delta t_g} = \left(\frac{\beta_z}{\beta_g}\right)^2 R^* \quad (19)$$

$$R^* = \frac{\theta_{x,g} \theta_{y,g}}{\theta_{x,z} \theta_{y,z}} \quad (20)$$

There are two different cases to be considered. One, the case of shot noise which is described by Poisson statistics where the noise source is contained within the signal. Two, the case where the noise is independent of the signal. For shot noise, the noise N is given as $$N \propto \sqrt{S} \quad (21)$$

and the signal to noise ratio S/N is $$S/N \propto \sqrt{S} \quad (22)$$

For the case of shot noise, the ratio of the signals at altitude z and GS altitude g is found from Eqs. (11), (13), and (19), for telescopes of diameter $D_z$ and $D_g$, as $$\frac{S_z}{S_g} = \left(\frac{D_z}{D_g}\right)^2 \left(\frac{d_z}{d_g}\right)^4 \left(\frac{R_g}{R_z}\right)^4 R^* A^2 \tag{23}$$

For small angles, θ is found from FIG. (1) as $$\theta \simeq 2X/R \tag{24}$$

and from Eq. (20) for $\theta_x = \theta_y$ and for small angles, R* is $$R^* \simeq \left(\frac{X_g}{X_z}\right)^2 \left(\frac{R_z}{R_g}\right)^2 \tag{25}$$

Then for small angles θ the signal ratio is found from Eqs. (23) and (25) as $$\frac{S_z}{S_g} \simeq \left(\frac{D_z}{D_g}\right)^2 \left(\frac{d_z}{d_g}\right)^4 \left(\frac{R_g}{R_z}\right)^2 \left(\frac{X_g}{X_z}\right)^2 A^2 \tag{26}$$

which agrees with a direct analysis for the case of small angles. Eq. (23) gives the signal ratio for measurements at altitude z compared with those at any other altitude g, for example, those at GS altitude. For measurements with the same resolution $$d_z = d_g \tag{27}$$

Eq. (23) gives $$\frac{S_z}{S_g} = \left(\frac{D_z}{D_g}\right)^2 \left(\frac{R_g}{R_z}\right)^4 R^* A^2 \tag{28}$$

To evaluate the signal to noise for the case of shot noise, it follows from Eqs. (22) and (23) that $$\frac{(S/N)_z}{(S/N)_g} = \left(\frac{D_z}{D_g}\right)\left(\frac{d_z}{d_g}\right)^2 \left(\frac{R_g}{R_z}\right)^2 (R^*)^{\frac{1}{2}} A \tag{29}$$

and for the same resolution $$\frac{(S/N)_z}{(S/N)_g} = \frac{D_z}{D_g}\left(\frac{R_g}{R_z}\right)^2 (R^*)^{\frac{1}{2}} A \tag{30}$$

Then for the case of the same signal to noise ratio, it follows from Eq. (29) that $$\left(\frac{d_g}{d_z}\right)^2 = \frac{D_z}{D_g}\left(\frac{R_g}{R_z}\right)^2 (R^*)^{\frac{1}{2}} A \tag{31}$$

Eq. (31) gives the ratio of the square of the resolutions for GS altitude and altitude z, respectively. This is also the ratio of the area of a spatial resolution element measured from GS altitude to that at altitude z. Thus, Eq. (31) is a direct measure of the information content of the two measurements. Eq. (31) holds assuming the available signal limits the resolution and not the diffraction limit. From Eq. (25) for small angles and $\theta_x = \theta_y$, Eq. (29) reduces to $$\frac{(S/N)_z}{(S/N)_g} \simeq \frac{D_z}{D_g}\left(\frac{d_z}{d_g}\right)^2 \frac{R_g}{R_z}\frac{X_g}{X_z} A \tag{32}$$

and similarly Eq. (31) for the ratio of the square of the resolutions reduces to $$\left(\frac{d_g}{d_z}\right)^2 \simeq \frac{D_z}{D_g}\frac{R_g}{R_z}\frac{X_g}{X_z} A \tag{33}$$

Eqs. (32) and (33) agree with an analysis for the case of small angles.

The altitude for a GS orbit is much greater than for a low or mid altitude orbit and as a result $R_g/R_z$ will be much larger than one. Also $X_g/X_z$ will also be much larger than one. It then follows from Eq. (23) and Eq. (26) that the signal ratio for altitude z and for GS altitude will be much greater than one for the same resolution and telescope diameter and there will be a large performance advantage for measurements from a low or mid altitude satellite LMAS system, as compared to a system at GS altitude. Similarly, the same terms $R_g/R_z$ and $X_g/X_z$ occur in Eqs. (30) and (32) for the ratio of the signal to noise terms and in Eqs. (31) and (33) for the ratio of the square of the resolutions. Then, there will also be a large advantage for using a low or mid altitude system for the signal to noise, as well as for the spatial resolution and information content measurements, compared to a GS orbital system. As hereinafter set forth, these qualitative findings are strongly supported by numerical calculations. Further, as will be shown high levels of performance may be obtained at the same or lower cost as a low performance GS system. Even a small improvement in information content, for example a 30 or 40% improvement, is generally considered to be of significant importance.

For the case where the noise in the measurement is independent of signal, Eq. (11) for the signal may be expressed in terms of the power as $$P' = \frac{S}{\Delta t} \tag{34}$$

$$\propto A_c \beta^2$$

The noise in terms of the power is given as $$N \propto (A_d \Delta f)^{\frac{1}{2}} \tag{35}$$

where Δf is the bandwidth of the measurement which is given as $$\Delta f \propto 1/\Delta t \tag{36}$$

where Δt is the measurement time. The detector area $A_d$ is given as $$A_d \propto (F\beta D)^2 \tag{37}$$

where F is the f number of the system which is the ratio of the focal length of the collector to its diameter. Then from Eqs. (35), (36), and (37), the noise is given as $$N \propto F\beta D / (\Delta t)^{\frac{1}{2}} \tag{38}$$

and the signal to noise ratio, the signal power P', Eq. (34) to the noise power N, Eq. (35), is $$S/N \propto D\beta(\Delta t)^{\frac{1}{2}}/F \qquad (39)$$

Then the ratio of the signal to noise at altitude z and GS altitude is found from Eqs. (39), (13), (19), and (20) as $$\frac{(S/N)_z}{(S/N)_g} = \frac{F_g}{F_z}\frac{D_z}{D_g}\left(\frac{d_z}{d_g}\right)^2\left(\frac{R_g}{R_z}\right)^2(R^*)^{\frac{1}{2}}A \qquad (40)$$

and for the same values of F at altitudes z and g, this reduces to $$\frac{(S/N)_z}{(S/N)_g} = \frac{D_z}{D_g}\left(\frac{d_z}{d_g}\right)^2\left(\frac{R_g}{R_z}\right)^2(R^*)^{\frac{1}{2}}A \qquad (41)$$

which is the same result as for shot noise, see Eq. (29). For systems with the same resolution Eq. (41) reduces to $$\frac{(S/N)_z}{(S/N)_g} = \frac{D_z}{D_g}\left(\frac{R_g}{R_z}\right)^2(R^*)^{\frac{1}{2}}A \qquad (42)$$

which is also the same result as for shot noise, see Eq. (30). For systems with the same signal to noise ratio, Eq. (41) gives $$\left(\frac{d_g}{d_z}\right)^2 = \frac{D_z}{D_g}\left(\frac{R_g}{R_z}\right)^2(R^*)^{\frac{1}{2}}A \qquad (43)$$

which is the same result as for shot noise, see Eq. (31).

Thus, for the case where the noise is independent of signal, the ratio of the performance at altitude z and GS altitude is the same as for shot noise providing the systems at the two altitudes use the same F number. Then the results for noise independent of signal are given by the results for shot noise.

For measurements with an active system, for example a laser system emitting a pulse of energy E, the signal collected at the receiver for a resolution d at range R after scattering off the atmosphere from a range gate of thickness ΔR (much greater than the transmitter equivalent pulse length) is $$S \propto \frac{EA_c}{R^2}\Delta R \qquad (44)$$

where $\Delta R = \Delta z/\cos\theta_n$ and $\Delta z$ is the vertical resolution. Eq. (44) is for a receiver angular field of view aligned with and greater than that of the transmitter. Then, for measurements with the same vertical resolution $\Delta z_g = \Delta z_z$, it follows from Eq. (44) that the signal ratio for altitude z and GS altitude is $$\frac{S_z}{S_g} = \frac{E_z}{E_g}\left(\frac{D_z}{D_g}\right)^2\left(\frac{R_g}{R_z}\right)^2 A^* \qquad (45)$$

where $$A^* = \cos\theta_{n_g}/\cos\theta_{n_z} \qquad (46)$$

and for the case of equal signal, $S_z = S_g$, it follows from Eq. (45) that $$\frac{E_g}{E_z} = \left(\frac{D_z}{D_g}\right)^2\left(\frac{R_g}{R_z}\right)^2 A^* \qquad (47)$$

Then for the same signal level and diameter telescopes, the measurement from a low or mid altitude system has an advantage over a GS orbit measurement system, in terms of the energy of the active system, by the factor $A^*(R_g/R_z)^2$ which is a very large factor.

Alternatively, if the active systems have the same total energy output per frame time T from altitude z and GS altitude, then $$E_z n_s(z) = E_g n_s(g) \qquad (48)$$

where $n_s$ is the number of resolution elements in the angular field $\theta_x$ by $\theta_y$, see Eq. (16), measured in the frame time T. Then the ratio of the energies at altitude z and GS altitude is found from Eqs. (48), (13), (16), and (20) as $$\frac{E_z}{E_g} = \left(\frac{d_z}{d_g}\right)^2\left(\frac{R_g}{R_z}\right)^2 R^* A \qquad (49)$$

and the signal ratio is found from Eqs. (45) and (49) as $$\frac{S_z}{S_g} = \left(\frac{D_z}{D_g}\right)^2\left(\frac{d_z}{d_g}\right)^2\left(\frac{R_g}{R_z}\right)^4 R^* AA* \qquad (50)$$

For the case where the resolution is the same for altitude z and GS altitude, then the signal ratio for an active system, Eq. (50), and the signal ratio for a passive system for shot noise, Eq. (23), are the same within a factor of $A^*/A$. Also, the ratio of the signal to noise ratios for active and passive systems, Eq. (29), are also the same within a factor of $\sqrt{A^*/A}$ for this case. However, for the case where the signal to noise ratio at altitudes z and g are the same, then it follows from Eqs. (50), (22), and (31) that $$\left(\frac{d_g}{d_z}\right)_{act} = \sqrt{\frac{A^*}{A}}\left(\frac{d_g}{d_z}\right)_{pas}^2 \qquad (51)$$

where act and pas designate active and passive systems, respectively. Thus the resolution improvement for an active system at any two altitudes g and z varies close to the square of the resolution improvement for a passive system. As a consequence, the resolution improvement for an active system is much larger than for a passive system.

2. Cost Analysis

Cost models can be constructed and used with performance models as follows. The cost c of a satellite system with n satellites with telescope diameter D can be represented by $$c \propto f(D)g(n) \qquad (52)$$

where the functions f and g represent the functional relationship of the cost on the telescope diameter and on the number of satellites. For a system of $n_z$ satellites with an altitude (configuration) z with telescope diameter $D_z$ and a second system of $n_g$ satellites with an altitude (configuration) g with telescope diameter $D_g$, the costs are related by $$\frac{c_g}{c_z} = \frac{f(D_g)g(n_g)}{f(D_z)g(n_z)} \quad (53)$$

Eq. (53) can be used to represent the cost even for the most complex systems. For systems where the cost varies as $D^a$ and $n^b$, it follows from Eq. (53) that $$\frac{D_g}{D_z} = \left(\frac{c_g}{c_z}\right)^{\frac{1}{a}}\left(\frac{n_z}{n_g}\right)^{\frac{b}{a}} \quad (54)$$

For high technology satellites, the parameter a is often found to be approximately 3 and the cost varies as $D^3$. There are generally also economies of scale in building a large number of identical units and as a result the parameter b may be much less than one. However, for a worst case scenario where the cost is proportional to the number of satellites, Eq. (54) reduces to $$\frac{D_g}{D_z} = \left(\frac{c_g}{c_z}\right)^{\frac{1}{3}}\left(\frac{n_z}{n_g}\right)^{\frac{1}{3}} \quad (55)$$

The approach to selecting the orbital characteristics for a given measurement, the satellite altitude and the number of satellites to be used, has generally been determined by historical precedence. This determines the system design as follows. One—to minimize the cost of a satellite system, the number of satellites used is minimized since the cost of a system increases directly with the number of satellites. Two—One of the main methods for improving the performance of a system is to increase the telescope diameter. This methodology produces the following result. A relatively small increase in telescope diameter (a factor of 2) produces a large increase in cost (a factor of 8 for $c=D^3$, see Eq. (55)) and gives a relatively small improvement in performance (a factor of $2^{1/2} \simeq 1.4$ for a passive system, see Eqs. (31) or (43)).

Various performance/constellation/cost methods are possible based on the methods of the performance evaluation, see for example Eqs. (31), (43), and (50), the cost/performance models Eqs. (53) to (55), and the number of satellites needed for any given constellation design, see for example Eqs. (1)-(8). One methodology used here utilizes tradeoffs between the performance of a satellite system (e.g., the resolution or the signal to noise ratio), the altitude of the satellite system, the angle $\theta_n$, the number of satellites required to meet a given measurement objective (e.g., one—near simultaneous, contiguous measurements over the whole earth; two—high resolution measurements with fast revisit times for any point on the earth; etc. ...), the ratio of the telescope diameters at the two altitudes being considered, and the resulting cost. In particular, it is generally found here that much higher performance can be obtained using low altitude satellites with small angles $\theta_n$ for any given measurement as opposed to high altitude satellites with large angles $\theta_n$ as is generally used. This, however, requires a large increase in the number of satellites required to make that measurement and from Eq. (55), a corresponding increase in cost. This increase in cost can be offset, however, by using smaller diameter measurement systems. The resulting system has a relatively low altitude with small (zenith) angles $\theta_n$ and uses a large constellation of satellites with small telescope diameter measurement instruments. The net performance of this system is much higher than that of a (relatively) high altitude system with large telescopes and one or a few satellites. Also, the cost of this low altitude system is the same or much less than that of a high altitude system. As will be shown in the performance analysis and discussion section, these methods allow a very large number of different systems to be designed with much higher performance and with the same or lower cost as current systems.

3. Signal (Signal to Noise) Limited Low Altitude Satellites

The methods of this section can also be used to improve the revisit time of high performance, low altitude satellites with non-contiguous, periodic coverage of the earth, approximately once every 12 hours. The performance analysis for non-contiguous coverage using partial satellite constellations, see discussion immediately preceding and immediately following equation (9A), is essentially identical to the prior analysis of this section (for contiguous/overlapping near simultaneous coverage of the earth using full satellite constellations) except for the effect of the frame time on the measurement. In the case of non-contiguous coverage, the frame time varies with altitude whereas in the case of contiguous coverage it does not. The analysis which follows accounts for the effects of the frame time varying with altitude.

The performance of a measurement system depends on the measurement time $\Delta t$, see Eq. (11), which is proportional to the frame time T, see Eq. (18). The ratio of the measurement times for altitudes z and g is given by Eq. (19) for the case where the frame times at altitudes z and g are assumed to be equal and thus cancel. For the case where the frame times at altitudes z and g are $T_z$ and $T_g$, it follows from Eq. (18) that the ratio of the measurement times at altitudes z and g is equal to $T_z/T_g$ times the right side of Eq. (19) which is $$\frac{\Delta t_z}{\Delta t_g} = \left(\frac{\beta_z}{\beta_g}\right)^2 R^* \frac{T_z}{T_g} \quad (19A)$$

It then follows from Eqs. (11) and (19A) that the signal ratio at the two altitudes z and g is equal to $T_z/T_g$ times the right side of Eq. (23). Also, it follows from Eq. (22) and Eq. (31) that the ratio of the squares of the resolutions at altitudes g and z for the same signal to noise ratio, is equal to $(T_z/T_g)^{1/2}$ times the right side Eq. (31) which is $$\left(\frac{d_g}{d_z}\right)^2 = \frac{D_z}{D_g}\left(\frac{R_g}{R_z}\right)^2 (R^*)^{\frac{1}{2}}\left(\frac{T_z}{T_g}\right)^{\frac{1}{2}} A \quad (31A)$$

The frame time, as discussed above with reference to equation (9A), is the time for a satellite to traverse its along-track angular field $\theta'_y$, as seen from the center of the earth, which is $$T = \frac{\theta'_y}{2\pi} T_{orb} \quad (56)$$

where $T_{orb}$ is the satellite's orbital period. For a satellite in a circular orbit, $T_{orb}$ is found by setting the gravitational force equal to the centripetal, centrifugal, force which gives $$T_{orb} = \frac{2\pi}{R_o \sqrt{g_o}}(R_o + z)^{\frac{3}{2}} \quad (57)$$

where $R_0+z$ is the distance between the satellite and the center of the earth, and $g_0$ is the acceleration of gravity at the surface of the earth. Then it follows from Eqs. (31A), (56), and (57) with $\theta'_z = \theta'_{y,z} = \theta'_{x,z}$ that $$\left(\frac{d_g}{d_z}\right)^2 = \frac{D_z}{D_g}\left(\frac{R_g}{R_z}\right)^2 (R^*)^{\frac{1}{2}}\left(\frac{\theta'_z}{\theta'_g}\right)^{\frac{1}{2}}\left(\frac{R_o+z}{R_o+g}\right)^{\frac{3}{4}} A \quad (58)$$

and from Eq. (58) substituting for R* with $\theta_x = \theta_y = \theta$ for symmetrical constellations gives $$\frac{D_g}{D_z} = \left(\frac{d_z}{d_g}\right)^2 \left(\frac{R_g}{R_z}\right)^2 \frac{\theta_g}{\theta_z}\left(\frac{\theta'_z}{\theta'_g}\right)^{\frac{1}{2}}\left(\frac{R_o+z}{R_o+g}\right)^{\frac{3}{4}} A \quad (59)$$

$D_g/D_z$ is related to the number of satellites by Eq. (55) which, for the same cost, gives the number of satellites at altitude z relative to those at altitude g, as $$n_z = n_g \left(\frac{D_g}{D_z}\right)^3 \quad (60)$$

For a large value of $D_g/D_z$, it follows that $n_z$ is large for the same cost as $n_g$, e.g., one satellite. The revisit time is then given by Eq. (9A) as $$T_R = \frac{T_{orb}}{\left(\frac{n}{n_e}\right)} \quad (61)$$

for $n_z \geq n_e$ where $n_e$ is the number of orbital planes, see Eq. (3), and where $n/n_e$ is the number of satellites per orbital plane. This is for integer values for $n_z$ and $n/n_e$. This can be achieved for $n_z$ by rounding the value of $n_z$ down to the next lowest integer. Integer values of $n/n_e$ can be achieved by adjusting the parameters to obtain values of $n/n_e$ slightly greater than or equal to an integer value and then rounding down to an integer value as above.

The revisit time is greatly reduced for large values of $D_g/D_z$. Eq. (59) shows that $D_g/D_z$ depends on the square of $R_g/R_z$, $d_z/d_g$ and on A. It then follows that the revisit time can be reduced by:

1) Reducing the altitude z relative to the reference altitude g of about 500 mi which is generally currently used for low altitude satellites.
2) Decreasing $\theta_{n_z}$ relative to the reference value of $\theta_{n_g}$ of about 68° at 500 mi altitude.
3) Decreasing the resolution of measurements at altitude z relative to the resolution at altitude g.

Alternately, the improved performance which results from steps 1) and 2) above can be used to improve the spatial resolution or the signal to noise ratio of the measurements. The Performance Analysis and Discussion section will show how these improvements are made and gives typical results.

4. Diffraction Limited Performance

The prior work in sections 1 and 3 is for the case where the satellite performance is signal limited. That is, the signal to noise ratio, the resolution, the measurement time and the revisit time are limited by the available signal. A second case is for diffraction limited performance. In this case, the resolution is limited by the size of the telescope aperture.

The theoretical limit for the resolution is given by the diffraction limit, which for a circular aperture is $$\beta_d = 1.22\frac{\lambda}{D} \quad (62)$$

which yields a resolution of $$d_d = 1.22\lambda R/(D \cos^{1/2}\theta_n) \quad (63)$$

Then the ratio of the diffraction limited resolution for altitude g and any altitude z is $$\frac{d_{d,g}}{d_{d,z}} = \frac{D_z}{D_g}\frac{R_g}{R_z}\sqrt{A} \quad (64)$$

The diffraction limited resolution is generally the highest resolution which can be achieved, independent of the available signal, with the exception of a synthetic aperture radar or phased array type system.

The Performance Analysis and Discussion section will give results for this case.

Performance Analysis and Discussion

The performance, constellation, and cost analysis methods developed in this work are applied to the problem of improving the performance of major satellite systems. These methods are used to show how the performance of sensors on geosynchronous and high altitude satellites, and the revisit time for full earth coverage for low altitude satellites can be greatly improved. Methods are also presented for achieving continuous coverage or much higher resolution for high performance, low altitude satellites. Both signal limited and diffraction limited performance are presented and compared for each of the applications above.

Table 2 shows some examples of satellite orbital and instrument parameters for the case of symmetrical constellations with $\theta'_x = \theta'_y$. These constellations have contiguous/overlapping full earth coverage and $n_e$ and $n_p$ values of 2×4 at 6000 mi altitude, 3×6 at 3000 mi altitude, 6×12 at 1000 mi altitude, 9×18 at 500 mi altitude, 13×26 at 250 mi, and 28×56 at 124.27 mi. The parameters shown include the satellite altitude, the scan angle θ, the scan angle θ' as seen form the center of the earth, the number of satellites n needed to obtain complete coverage of the earth in the frame time T, a time of the order of a fraction of a second to thousands of seconds, and the chord length of the measurement, 2X. The angle θ' is also the satellite angular spacing as seen from the center of the earth, see Eqs. (3) and (5).

TABLE 2

Scan Angle θ, Scan Angle θ' as Measured from the Center of the Earth, Number of Satellites (n), and Chord Length of Measurements (2X) for Various Satellite Altitudes (z).

| z (mi) | θ/2 (deg) | θ'/2 (deg) | n | $\frac{\theta + \theta'}{2}$ (deg) | 2X (mi) |
|---|---|---|---|---|---|
| 6000 | 21.37 | 45 | 8 | 66..4 | 5605 |
| 3000 | 29.3 | 30 | 18 | 59.3 | 3963 |
| 1000 | 42.1 | 15 | 72 | 57.1 | 2051 |
| 500 | 52.86 | 11 | 162 | 63.86 | 1512 |
| 250 | 59.72 | 6.923 | 338 | 66.6 | 955.4 |
| 124.27 | 59.57 | 3.214 | 1568 | 62.8 | 444.4 |

Values of $\theta_n$ less than 68° are used herein, which is the approximate value for a GS satellite for a latitude of 60°, in order to limit the resolution degradation such as that which occurs for GS satellite measurements at high latitude and to approximately cancel the atmospheric effects at the edge of the scan for ratio measurements. The residual atmospheric effects give a worst case result for the measurements at altitude z compared with those at GS altitude.

Table 3 is an intermediate step calculational tool for the scaling factors $(D_g/D_z)^{n'}$ to allow the performance to be adjusted for the case of equal system cost for n satellites at altitude z and 5 satellites at GS altitude where the cost varies as the cube of the collector diameter, see Eq. (55). For example, for the case of 72 satellites at 1000 mi altitude, the ratio of the number of satellites at altitude z and GS altitude, n/5, is 14.4. Then, for a cost which varies as $D^3$, the diameter of the collector at altitude z would need to be reduced by about 2.433 times to allow a comparison at the same cost. The last two columns in this table give the performance reduction for equal cost where the performance varies as D (the last column) or $D^2$ (next to last column). Five satellites for coverage from GS orbit are selected since, as previously discussed, 3 satellites are required for partial earth coverage up to 60° latitude from this orbit. It is then optimistically assumed that full earth coverage could be obtained with two additional high altitude satellites for a total of five satellites. This same method of cost analysis could be used for other problems with different numbers of satellites, different altitudes and different cost models.

TABLE 3

Intermediate Table of Scaling Factors $(D_g/D_z)^{n'}$ for Calculating the Performance for Systems of Equal Cost for n Satellites at Altitude z and 5 Satellites at Geosynchronous Altitude g for a Cost Proportional to $D^3$.

| z (mi) | n | n/5 | $(D_g/D_z)^2$ | $D_g/D_z$ |
|---|---|---|---|---|
| 6000 | 8 | 1.6 | 1.368 | 1.170 |
| 3000 | 18 | 3.6 | 2.349 | 1.533 |
| 1000 | 72 | 14.4 | 5.919 | 2.433 |
| 500 | 162 | 32.4 | 10.163 | 3.188 |
| 250 | 338 | 67.6 | 16.59 | 4.074 |
| 124.27 | 1568 | 313.6 | 46.16 | 6.794 |

Table 4 gives a performance comparison for measurements at altitude z and at GS altitude g for the signal S for the case of shot noise; and for the signal to noise ratio S/N and the square of the resolution $d^2$ for the case of shot noise or the case of noise independent of signal which give the same result for systems with the same F number as was discussed previously following Eq. (43). The results are given for a system with n satellites at altitude z and 5 satellites at GS altitude for full earth coverage in the frame time T with the same sensor system. That is, the systems have the same diameter collector and the same detector capability. These results are not adjusted for equal cost. As shown, there is a very large performance advantage for all performance measures for a low altitude satellite system as compared to a GS system, but at a much higher cost. For example, a system at 250 mi altitude with of the order of 338 satellites has a signal advantage of the order of 90,000 times for measurement at the edge of the scan, ED, or 1 million times along the nadir, NA. For this same altitude, the square of the resolution for measurements at the edge of the scan for an LMAS system is of the order of 300 times higher than for measurements for a GS satellite system and of the order of 1,000 times higher, for this same case, for measurements on the nadir. The calculations at the edge of the scan are at the angles given in Table 2.

TABLE 4

Performance Comparison for Measurements for a System of n Satellites at Altitude z and 5 Satellites at Geosynchronous Altitude g for the Signal (S), signal to noise (S/N) and Square of the Resolution ($d^2$) for Measurements on the Nadir NA and at the Edge of the Scan ED for Shot Noise and Noise Independent of the Signal.

| z (mi) | n | NA or ED | $S_z^+/S_g$ | $(d_g/d_z)^2$ or $(S/N)_z/(S/N)_g$ |
|---|---|---|---|---|
| 6000 | 8 | NA | 27 | 5.2 |
|  |  | ED | 19 | 4.4 |
| 3000 | 18 | NA | 230 | 15 |
|  |  | ED | 350 | 19 |
| 1000 | 72 | NA | 9000 | 95 |
|  |  | ED | 11000 | 100 |
| 500 | 162 | NA | $9.1 * 10^4$ | 300 |
|  |  | ED | $2.0 * 10^4$ | 140 |
| 250 | 338 | NA | $1.1 * 10^6$ | 1100 |
|  |  | ED | $8.9 * 10^4$ | 300 |
| 124.27 | 1568 | NA | $1.9 * 10^7$ | 4300 |
|  |  | ED | $3.3 * 10^6$ | 1800 |

+For Shot Noise Only

Table 5 gives the performance comparison of Table 4 for the case of equal system cost for an LMAS system at altitude z with contiguous/overlapping full earth coverage and a GS system at altitude g with partial earth coverage, where the cost is proportional to $D^3$. The scaling factors of Table 3 are used to reduce the performance given in Table 4 to obtain the results of Table 5 for equal cost, as given by Eq. (55) and discussed for Table 3. As shown in Table 5, at lower altitudes the performance of the measurements at altitude z is substantially higher compared to that at GS altitude. That is, the lower the satellite altitude, the higher the performance compared to a GS system. For example, for measurements at the edge of the scan, the signal for a system at 6,000 mi altitude is of the order of 14 times higher than that of a GS system whereas for a system at 124.3 miles the signal is of the order of 70,000 times higher. Also, at the edge of the scan, the square of the resolution is of the order of 4 times higher for a system at 6,000 mi compared to a GS system whereas it is of the order of 270 times higher for a system at 124.3 mi altitude compared to a GS system. Moreover, the performance comparison discussed here and shown in Table 5 is for systems for the same cost.

TABLE 5

Performance Comparison of Table 4 Adjusted for Equal System Cost for Cost Proportional to $D^3$ (for Measurements for a System of n Satellites at Altitude z and 5 Satellites at Geosynchronous Altitude g for the Signal (S), signal to noise (S/N) and Square of the Resolution ($d^2$) for Measurements on the Nadir NA and at the Edge of the Scan ED).

| z (mi) | n | NA or ED | $S_z^+/S_g$ | $(d_g/d_z)^2$ or $(S/N)_z/(S/N)_g$ |
|---|---|---|---|---|
| 6000 | 8 | NA | 20 | 4.4 |
|  |  | ED | 14 | 3.7 |
| 3000 | 18 | NA | 97 | 9.9 |
|  |  | ED | 150 | 12 |
| 1000 | 72 | NA | 1500 | 39 |
|  |  | ED | 1800 | 43 |
| 500 | 162 | NA | 9000 | 95 |
|  |  | ED | 2000 | 44 |
| 250 | 338 | NA | $6.9 * 10^4$ | 260 |
|  |  | ED | $5.4 * 10^3$ | 73 |
| 124.27 | 1568 | NA | $4.1 * 10^5$ | 640 |
|  |  | ED | $7.2 * 10^4$ | 270 |

+For Shot Noise Only

The method of Table 5 may also be used to make equal cost comparisons of the performance for satellite systems at different altitudes by taking the ratio of the performance of those systems at those altitudes assuming the same value of $\theta_n$ at the two altitudes. For example, for the case of signal measurements on the nadir, the performance of a system at 124.27 mi altitude is of the order of $2.0 \times 10^4$ times higher than that of a system at 6,000 mi with the same cost, i.e., the ratio of $4.1 \times 10^5/20$. We note that the system at 6,000 mi altitude would use 8 satellites each carrying a large sensor and the system at 124.27 mi would use 1,568 satellites, each carrying a very small sensor.

The method of Eq. (55) and Table 5 may also be used to determine the performance of systems with a small fraction of the cost of a GS satellite system. For example, for a cost of ⅛, one-eighth, that of a GS system, the diameter of the LMAS system would be reduced by a factor of 2 for a cost which varies as $D^3$. The performance is then found from Eq. (23) for the signal ratio which decreases by a factor of 4 for this change and from Eqs. (30) and (31) for the signal to noise ratio and the square of the resolution which decrease by a factor of 2 for this change. As a result, the corresponding performance of all the systems shown in Table 5 would still be higher than that of the GS system, and the performance of the lower altitude systems would be higher than that of a GS system by very large factors.

For the equal cost comparisons of Table 5, the performance of an LMAS system with n satellites at altitude z can also be compared with that of a GS system with only 1 satellite, which would give less than ⅓, one-third, full earth coverage and which would obviously give an unfair advantage to the GS satellite system in the performance comparison. In this case, the diameter of the telescope for the LMAS configuration would be reduced by a factor of the order of 1.71, the cube root of 5, see Eq. (55), beyond that given in Table 3 and already included in the equal cost comparison of Table 5. As can be determined from Table 5 and Eqs. (23) and (31), the performance comparison for a complete LMAS system at altitude z versus only 1 GS satellite still yields very large performance advantages for the LMAS system. For example, for an altitude of 124.3 mi (200 km) and for measurements on the edge of the scan, an LMAS system would have a factor of the order of 25,000 times higher performance for the signal or a factor of the order of 160 times higher performance for the square of the resolution as compared to a GS system with only 1 satellite, equal cost, and only very partial, less than ⅓, earth coverage.

The method of Table 3 may be applied to calculate the performance for the case of equal cost for the orbital configuration of q low altitude, high performance satellites (which can be used to obtain improved coverage and greatly reduced revisit time) and for the case of a single low altitude, high performance satellite, see FIG. 14 and the prior discussion of this case. For coverage using 1 set of 4 satellites vs. 1 satellite for an approximate 200 km altitude orbit, this would give revisit times for observations anywhere on the earth of once every 8 or 9 orbits. For the case of a cost model which varies as the cube of the telescope diameter as discussed for Table 3, measurements could be made with this small constellation of 4 satellites with telescopes with a reduced diameter of about 1.59 times at the same cost as a high performance system. This would result in about 26% less spatial resolution for the case where the resolution is signal limited, see Eq. (31), or a factor of 1.59 less resolution for the case where the resolution is diffraction limited. If this system of 4 satellites is compared to a 2 satellite system, the difference in resolution would only be about 12% for the signal limited case or a factor of 1.26 for the diffraction limited case. This represents only one of a large number of possible methods of use.

Table 6 shows the cost advantage for a low or mid-altitude satellite, LMAS, system versus a GS system for the GS system to obtain the same performance as the LMAS system, as shown in Table 5. This is for a cost which varies as $D^3$. As shown in Table 6, the cost advantage of the LMAS system versus a GS system varies from of the order of 50 times to of the order of 250 million times depending on altitude. Thus, to obtain the same performance as a given LMAS system, the cost of a GS system would have to be increased by the factors shown in Table 6, for example, about 20 million times for a low altitude system at 124 mi at the edge of the scan. These very large cost advantages can be understood as follows. In this case, the term $(d_g/d_z)^2$, the ratio of the resolution squared at GS altitude and at altitude z, varies as the ratio of the collector diameters, see Eq. (31). Then, to account for only a factor of 2 change in $(d_g/d_z)^2$, it requires an increase in cost of 8 times since we assume the cost varies as $D^3$. Similarly, for a factor of 73 change in $(d_g/d_z)^2$ as shown in Table 5 at the edge of the scan for 250 mi altitude, the increased cost of a GS system to obtain this performance is $(73)^3$ or a factor of the order of 400,000 times. Thus, there is a very large increase in cost to obtain improved performance and the performance improvements shown for low- and mid-altitude systems are very large. Other cost models using, for example, a cost which varies as $D^a$ could also just as easily be used with this method.

TABLE 6

Ratio of the Cost of a Geosynchronous (GS) System to the Cost of a System at Altitude Z for the GS System to Obtain the Same Performance as the Satellite System at Altitude Z for a Cost Proportional to $D^3$ (for Measurements on the Nadir NA and at the Edge of the Scan ED)

| Z (mi) | NA or ED | COST GS SYSTEM/ COST ALT z SYSTEM |
|---|---|---|
| 6000 | NA | 87 |
|  | ED | 53 |
| 3000 | NA | 960 |
|  | ED | 1800 |
| 1000 | NA | $5.9 * 10^4$ |
|  | ED | $7.7 * 10^4$ |
| 500 | NA | $8.5 * 10^5$ |
|  | ED | $8.7 * 10^4$ |
| 250 | NA | $1.8 * 10^7$ |
|  | ED | $3.9 * 10^5$ |
| 124.27 | NA | $2.6 * 10^8$ |
|  | ED | $1.9 * 10^7$ |

The improved performance given in table 5 is based on the strong dependence of resolution on altitude, see Eq. (31), and the use of cost and constellation models to improve the system performance as given in tables 3-6 and the associated discussion. More generally, Eq. (31) also has a strong dependence on the angle $\theta_n$ through the slant range R and on A which varies as $\cos^2 \theta_n$. The performance can then be improved with respect to the angle $\theta_n$ in the same way it was for altitude.

Table 7 gives, as an example, the square of the resolution for selected angles, adjusted for equal cost, for a system of n satellites at altitudes of 500 and 124.3 mi compared to that of 5 satellites at geosynchronous altitude g. As shown in table 7, for large angles $\theta_n$ of about 63°, the performance at the edge of the scan is significantly poorer than that at the nadir. The resolution on the edge of the scan is greatly improved, however, by reducing $\theta_n$. In particular, it can be improved by approximately 3 times by reducing $\theta_n$ from about 63° to 51°, and by more than 10 times by reducing $\theta_n$ from 63° to 30°.

Thus, substantially higher levels of performance can be obtained on the edge of the scan, for the same cost, using smaller angles $\theta_n$. Further, the resolution on the edge of the scan is the limiting factor in the performance since the resolution falls off sharply with increasing angle $\theta_n$, see Eq. (31). In addition, the resolution also falls off sharply for large angles $\theta_n$ due to atmospheric transmission loss.

TABLE 7

Square of the Resolution Ratio vs. Angle adjusted for Equal System Cost for n satellites at altitudes z of 500 and 124.27 mi and 5 satellites at Geosynchronous altitude g- $\theta_n$ (see Eq. (6A)), $\theta'$ is the scan angle seen from the center of the earth, $d^2$ the square of the resolution at GS altitude g or altitude z, NA the nadir, and ED the edge of the scan.

| $\theta_n$ (deg) | $\theta'/2$ (deg) | n | $\left(\frac{d_g}{d_z}\right)^2_{NA}$ | $\left(\frac{d_g}{d_z}\right)^2_{ED}$ |
|---|---|---|---|---|
| z = 500 mi | | | | |
| 63.86 | 11 | 162 | 95 | 44 |
| 51.6 | 7.5 | 288 | 94 | 140 |
| 30.41 | 3.7 | 1250 | 95 | 470 |
| 15.73 | 1.8 | 5000 | 115 | 860 |
| z = 124.27 | | | | |
| 62.79 | 3.21 | 1568 | 640 | 270 |
| 51.5 | 2.14 | 3700 | 580 | 790 |
| 29.98 | 1.0 | 16200 | 600 | 3000 |

As previously discussed for active measurements, Eq. (50) gives the ratio of the measured signals for altitude z and GS altitude where the satellites at the two altitudes have the same average output power, Eq. (48), for measurement. For measurements with the same resolution, $d_z = d_g$, the equation for the signal ratio (or the ratio of the signal to noise terms) for an active system at altitudes z and g is equal to A*/A (or $\sqrt{A*/A}$) times that of a passive system. Then a performance comparison for the signal ratio (or the ratio of the signal to noise terms) for an active system is equal to A*/A (or $\sqrt{A*/A}$) times that of the results for a passive system, given by tables 4 and 5. Table 5 is adjusted for equal system cost and is for the case of an active system where the cost of the satellite power source is a small part of the total system cost. These tables show very large performance advantages for low or mid-altitude active systems as compared to an active system at GS altitude. For example, for measurements of the signal at 250 miles altitude on the nadir, the performance advantage of an active LMAS system versus an active GS system is of the order of 1 million times from Table 4 and 70,000 times from Table 5.

However, for the case of an active system where the signal to noise ratio at altitudes z and g are the same, Eq. (51) shows the resolution improvement for an active system for any 2 altitudes g and z is equal to $\sqrt{A*/A}$ times the square of the resolution improvement for a passive system. Then, the resolution improvement $d_g/d_z$ for an active system is given by $\sqrt{A*/A}$ times the columns for $(d_g/d_z)^2$ in tables 4 and 5. For example, for measurements at 250 mi altitude on the nadir, the resolution improvement is about 1,000 times from table 4 and 250 times from table 5 which is much larger than the corresponding improvement for passive systems.

The methods of this disclosure can also be used to obtain improved satellite revisit time for low altitude satellites. The important terms in Eq. (59) which can be used to improve the revisit time are $(R_g/R_z)^2$ which depends on altitude and $\theta$, A which depends on $\cos^2 \theta_n$, $\theta$, $\theta'$, and $d^2$. The dependence on altitude will be treated first. For altitudes z much less than g, $R_g/R_z$ will be large and $D_g/D_z$ will be much greater than one.

This is the condition needed to obtain much improved satellite revisit time as discussed previously in conjunction with Eqs. (59)-(61). For a low altitude satellite with an altitude g of 500 mi, altitudes z of 200 mi, 124.3 mi (=200 km), and 90 mi are used as examples. Table 8 shows the parameters $\theta/2$, $\theta'/2$, $\theta_n$ and Y for these altitudes for a value of $\theta_n$ of approximately 63°. Large angles such as this, or larger, are typically used for satellite systems to obtain as much coverage as possible for a single satellite pass. For an altitude of 500 mi, the value used for $\theta_n$ is approximately 68°. This value is required to provide coverage for the rotation of the earth, $\theta' \simeq 25.22°$, in the time of one satellite orbit. If this condition is not met, much poorer revisit times at 500 mi altitude will result.

TABLE 8

Parameters for low altitude systems at various altitudes z - $\theta$ is the scan angle of the satellite, $\theta'$ is the scan angle as seen from the center of the earth, and Y is the chord length in the along track direction.

| z (mi) | $\theta/2$ (deg) | $\theta'/2$ (deg) | $(\theta + \theta')/2$ (deg) | Y (mi) |
|---|---|---|---|---|
| 500 | 55.46 | 12.61 | 68.07 | 865 |
| 200 | 58.82 | 5.17 | 63.99 | 357 |
| 124.3 | 59.57 | 3.21 | 62.78 | 222 |
| 90 | 59.90 | 2.33 | 62.25 | 161 |

Table 9 gives the revisit time $T_R$, the ratio of the telescope diameters $D_{500}/D_z$ at 500 mi and altitude z, and the number of satellites n at altitude z which can be obtained for the same cost and the same resolution as one satellite at an altitude of 500 mi for signal limited systems. The results are shown for measurements in the nadir direction, NA, and also on the edge of the scan, ED, at an angle $\theta/2$. As shown, the revisit time can be improved by more than 100 times from approximately 12 hours, 720 minutes, for a single satellite at 500 mi altitude to approximately 7 minutes at 124 mi altitude and to almost 2 minutes at 90 mi altitude. In addition, semi-continuous coverage can be obtained on the edge of the scan at 90 mi altitude. These results are for the same cost, the same resolution, and the same signal to noise as a single satellite at 500 mi altitude for a cost which varies as $D^3$.

TABLE 9

Revisit time $T_R$ for signal limited systems at various altitudes z with the same cost and resolution - D is the telescope diameter, n the number of satellites, NA the nadir, and ED the edge of the scan.

| z (mi) | NA, ED | $D_{500}/D_z$ | n | $T_R$ (min) |
|---|---|---|---|---|
| 500 | NA | 1 | 1 | 720* |
| | ED | 1 | 1 | 720* |
| 200 | NA | 3.58 | 46 | 45 |
| | ED | 5.00 | 125 | 15 |
| 124.3 | NA | 7.12 | 361 | 7.4 |
| | ED | 10.96 | 1320 | 1.9 |
| 90 | NA | 11.42 | 1488 | 2.3 |
| | ED | 18.30 | 3042 | Cont.† |

†Continuous coverage with, in addition, a significant improvement in the square of the resolution.
*Approximate value The revisit time can also be reduced (further) to provide semi-continuous coverage for a low altitude satellite. The number of satellites needed for continuous coverage at altitude z is given in general by Eq. (6) and for the case of symmetrical constellations by $n=2n_e^2$, see Eq. (7C). Continuous coverage can be obtained with Eqs. (7C), (59) and (60), by one—decreasing the altitude as discussed previously to obtain $n_z$ satellites at altitude z for the same resolution at altitudes z and g; two—decreasing the resolution of the measurements at altitude z, relative to those at altitude g, by the factor $$\frac{d_z}{d_g} = \left(\frac{2n_e^2}{n_z}\right)^{\frac{1}{6}} \qquad (65)$$

for a signal limited system. Table 10 gives results for the reduction in resolution needed to obtain continuous coverage on the nadir and at the edge of the scan. As shown, for measurements on the nadir, this corresponds to a reduction in resolution of approximately 1.28 times at 124.3 mi altitude and 1.13 times at 90 mi altitude.

TABLE 10

Resolution ratio $d_z/d_g$ at altitude z and 500 mi for signal limited systems, sl, for semi-continuous earth coverage for measurements on the nadir, NA, and the edge of the scan, ED, at various altitudes.

| z | NA, ED | $(d_z/d_g)_{sl}$ |
|---|---|---|
| 500 | NA | 2.25 |
|  | ED | 2.25 |
| 200 | NA | 1.55 |
|  | ED | 1.32 |
| 124.3 | NA | 1.28 |
|  | ED | 1.03 |
| 90 | NA | 1.13 |
|  | ED | 1.0 |

Table 11 shows the effect on the revisit time of reducing the angle $\theta_n$ for measurements with n satellites at altitude z at the edge of the scan with the same cost and resolution as 1 satellite at 500 mi altitude. The results given here use the angular dependence of the performance in Eqs. (58) and (59) to improve the revisit time. As shown, a small change in the angle $\theta_n$ from approximately 63° to 52° is sufficient to produce semi-continuous coverage for altitudes of both 200 mi and 124.3 mi. The increase in performance due to this change in angle also produces, in addition, a substantial improvement in the square of the resolution at 200 mi altitude as well as at an altitude of 124.3 mi.

TABLE 11

Revisit time $T_R$ vs. Angle for Signal Limited Systems at the edge of the scan with the same cost and resolution - z is the altitude, $\theta_n$ see Eq. (6A), $\theta'$ is the scan angle seen from the center of the earth, D the telescope diameter, and n the number of satellites.

| z (mi) | $\theta_n$ (deg) | $\theta'/2$ (deg) | $D_{500}/D_z$ | n | $T_R$ (min) |
|---|---|---|---|---|---|
| 500 | 68.07 | 12.61 | 1 | 1 | 720* |
| 200 | 63.99 | 5.17 | 5.00 | 125 | 15 |
|  | 52.64 | 3.47 | 16.28 | 1352 | cont.† |
| 124.3 | 62.78 | 3.21 | 10.96 | 1320 | 1.9 |
|  | 51.5 | 2.14 | 34.92 | 3698 | cont.†† |

†,††Continuous coverage with, in addition, a substantial improvement in the square of the resolution.
*Approximate value The improved performance obtained by using lower altitudes z and smaller angles $\theta_n$ than at altitude g could alternately be used to improve the spatial resolution of the measurements. For signal limited performance, it follows from Eqs. (55), (58) and (59) that if the spatial resolution is improved by the maximum amount while maintaining the same or better revisit time as that at altitude g, then the improvement in resolution is $$\left(\frac{d_g}{d_z}\right)^2 = \frac{D_g/D_z}{(\theta'_g/\theta'_z)^{\frac{1}{3}}} \qquad (65A)$$

where $\theta'_g/\theta'_z$ is the number of satellites needed to maintain the same angular coverage as at altitude g and its value is rounded up to the next largest integer. The term $D_g/D_z$ in Eq. (65A) is for $d_z=d_g$ and the values given in tables 9 and 11 produce large resolution improvements at the same cost if used for this purpose.

The effects of diffraction limited performance are now considered. Table 12 compares the ratio of the performance of diffraction limited systems on the nadir at GS altitude with those at various altitudes z, see Eq. (64). It also compares the performance of signal limited systems with this diffraction limited performance. This is for a system of n satellites at altitude z which give semi-continuous, contiguous coverage of the earth for the same cost, see tables 3 and 5. As shown, a diffraction limited system shows a greater improvement in resolution for all altitudes than a signal limited system. For example, the improvement in resolution for a diffraction limited system at 500 mi altitude is approximately 14 times compared to a GS system whereas it is 9.7 times for a signal limited system. Thus, the gains in performance for a diffraction limited system are greater than the gains for a signal limited system given in tables 5 and 6. It may also be noted that for equal cost, the performance of all systems improves at lower altitudes.

TABLE 12

Performance comparison of Table 5 (for a system of n satellites at altitude z and 5 satellites at Geosynchronous altitude g) for signal limited systems sl and diffraction limited systems d on the nadir for the same cost.

| z (mi) | $(d_g/d_z)_{sl}$ | $(d_g/d_z)_d$ |
|---|---|---|
| 6000 | 2.1 | 3.2 |
| 3000 | 3.1 | 4.8 |
| 1000 | 6.2 | 9.1 |
| 500 | 9.7 | 14 |
| 250 | 16 | 22 |
| 124.27 | 25 | 26 |

The case of low altitude diffraction limited systems is now considered. The resolution of diffraction limited systems is given by Eq. (63) and the ratio of the resolution at altitudes g and z is given by Eq. (64). Then for the same resolution for altitudes g and z, it follows from Eq. (64) that $$D_g/D_z = (R_g/R_z)\sqrt{A} \qquad (66)$$

This limits the value of $D_g/D_z$. Table 13 gives the value of $D_g/D_z$, the number of satellites, and the resulting revisit time for diffraction limited systems with the same cost and resolution. As shown, reducing the altitude and the telescope diameter significantly improves the revisit time, e.g., from 720 min at 500 mi altitude to 11 min on the edge of the scan at 90 mi altitude. In addition, the revisit time for measurements on the edge of the scan can be significantly further improved (reduced) by reducing $\theta_n$ as was used to improve the revisit time for signal limited systems, see Table 11.

TABLE 13

Revisit time $T_R$ for diffraction limited systems with the same cost and resolution at various altitudes z - D is the telescope diameter, n is the number of satellites, g is 500 mi, NA the nadir and ED the edge of the scan.

| z (mi) | NA/ED | $D_g/D_z$ | n | $T_R$ (min) |
|---|---|---|---|---|
| 500 | NA | 1 | 1 | 720* |
|  | ED | 1 | 1 | 720* |

TABLE 13-continued

Revisit time $T_R$ for diffraction limited systems with
the same cost and resolution at various altitudes z - D is
the telescope diameter, n is the number of satellites,
g is 500 mi, NA the nadir and ED the edge of the scan.

| z (mi) | NA/ED | $D_g/D_z$ | n | $T_R$ (min) |
|---|---|---|---|---|
| 190.8 | NA | 2.62 | 18 | 90 |
|  | ED | 3.04 | 28 | 90 |
| 124.3 | NA | 4.02 | 65 | 44 |
|  | ED | 4.99 | 124 | 22 |
| 90 | NA | 5.56 | 171 | 22 |
|  | ED | 7.04 | 349 | 11 |

*Approximate value

For diffraction limited performance, semi-continuous coverage can be obtained from Eqs. (7C), (60), and (64) for $$\frac{d_z}{d_g} = \left(\frac{2n_e^2}{n_z}\right)^{\frac{1}{3}} \tag{67}$$

where $n_z$ is the number of satellites for the same resolution at altitudes z and g. (See table 13 for values.) Table 14 shows the resolution ratio $d_z/d_g$ needed to obtain continuous coverage on the nadir at various altitudes for diffraction limited systems. As shown, the loss in resolution to achieve continuous coverage is about 2.9 or 2.6 times at altitudes of 124.3 or 90 mi whereas for signal limited systems the loss in resolution is about 1.28 or 1.13 times for the same altitudes, see table 10.

TABLE 14

Resolution ratio $(d_z/d_g)$ at altitude z and 500 mi
for diffraction limited systems d for semi-continuous
earth coverage for measurements on the nadir.

| z (mi) | $(d_z/d_g)_d$ |
|---|---|
| 200 | 3.46 |
| 190.8 | 3.30 |
| 124.27 | 2.89 |
| 90 | 2.61 |

The improved performance obtained by using lower altitudes z and smaller angles $\theta_n$ than at altitude g could also be used to improve the spatial resolution of diffraction limited measurements in the same way as it was for signal limited measurements, see Eq. (65A). It follows from Eqs. (55) and (64) that if the spatial resolution is improved while maintaining the same or better revisit time as that at altitude g, then the improvement in resolution is $$\left(\frac{d_g}{d_z}\right) = \frac{D_g/D_z}{(\theta'_g/\theta'_z)^{\frac{1}{3}}} \tag{67A}$$

where $\theta'_g/\theta'_z$ is the number of satellites needed to maintain the same angular coverage as at altitude g and its value is rounded up to the next largest integer. The term $D_g/D_z$ in Eq. (67A) is for $d_z = d_g$ and the values given in table 13 produce large resolution improvements at the same cost if used to improve the resolution instead of the revisit time.

Figure 20:
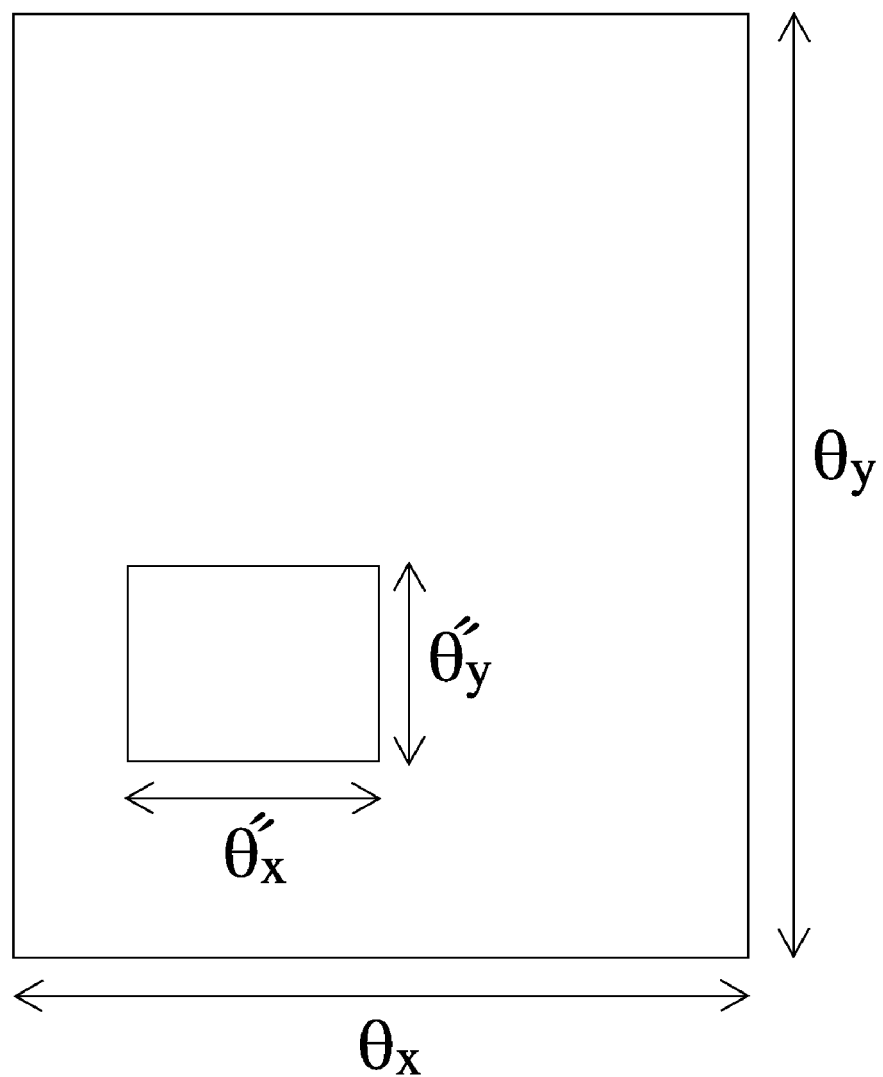
FIG. 20—The area $θ''_x$ by $θ''_y$ of an ultra-high performance measurement is contained within a portion of the coverage area $θ_x$ by $θ_y$ of a given satellite as it passes over the coverage area.

An ultrahigh performance system, as discussed earlier, is used to scan a small area of interest that corresponds to $\theta''_x$ by $\theta''_y$, much smaller than the coverage area $\theta_x$ by $\theta_y$ used for each of the n low or medium altitude satellites, see FIG. 20.

The advantage to using an ultrahigh performance system for a signal limited system is found from Eqs. (11), (12), (18), and (22) with $\theta_x = \theta_y$, which shows the signal to noise ratio is given as $$S/N \propto D\left(\frac{d}{R}\right)^2 \frac{1}{\theta}(pq')^{1/2}\cos\theta_n$$

The improvement in performance for an ultrahigh performance system $P_{ul}$ as compared to a standard system P where the field of view of the detector array $\leq \theta''_x$ by $\theta''_y$, and for the same array size, range, frame time, telescope diameter, zenith angle and atmospheric path is given as $$\frac{P_{ul}}{P} = \frac{\theta}{\theta_{ul}} \tag{68}$$

where the performance P is given in terms of the signal to noise for systems with the same resolution as $$P = S/N \tag{69}$$

or in terms of the square of the resolution for systems with the same signal to noise as $$P = 1/d^2 \tag{70}$$

where the subscript ul applies for an ultrahigh performance system. Eq. (69) applies generally, whereas Eq. (70) applies assuming signal effects limit the resolution and not the diffraction limit. Then for a target area with an approximate size of 50 miles by 50 miles and the parameters of Table 2, the gain in the performance, Eq. (68), is of the order of 90 times at 6000 miles altitude, 60 times at 3000 miles, 30 times at 1000 miles, 15 times at 500 miles, 10 times at 250 miles, and 5 times at 124 miles. For a comparison of an ultra-high performance LMAS system at altitude z and a standard GS system, these gains are in addition to the gains in performance shown in Table 5 for systems of equal cost at altitude z and GS altitude. These performance improvements can be used for improvements in signal to noise, resolution (subject to the diffraction limit), or frame time. This capability can be used for one or more up to all n satellites in the LMAS system.

One important result of using an LMAS constellation with a relatively large number of satellites is that the constellation is much less affected by the failure or loss of a single satellite. For example, the loss of one GS satellite providing coverage of North and South America, out of a system of 3 GS satellites, would be catastrophic, e.g., a loss of hurricane tracking and coverage in North America. On the other hand, the loss of one out of 338 satellites in an LMAS constellation at 250 mi altitude would only result in a small, 0.3%, loss of data. Also, the economic consequences of such a loss in terms of the replacement cost of the satellite would also be small for an LMAS constellation, a cost of about 1% of the cost of replacing one GS satellite.

An important advantage to using an LMAS constellation with much smaller diameter instruments than a GS system, see Table 3, is that the LMAS system is a relatively low technology system. As a result, the satellites are not only much lower cost but they are also much easier to design, build, launch, and they are less susceptible to failure due to misalignment. A high performance, low altitude LMAS constellation would also use much smaller diameter telescopes than a current high performance, low altitude system. As a result, the LMAS system uses a lower level technology and has the same advantages over a current high performance, low altitude system as those described above, i.e., the satellites are smaller, easier to design, build, and less susceptible to failure.

There are various additional applications that can be found in a straight forward manner using the general methods given here. For example, for a pulsed or a continuous wave (CW) active (laser) system reflecting off a hard target with reflectivity r, $\Delta R$ in Eq. (44) is replaced by r, and Eqs. (45) and (47-51) are the same as before with $A^*=1$, and the same analysis applies. Also, if instead of requiring that Eq. (48) holds for active systems, it could be required that the energy output from the whole set of $n_z$ satellites at altitude z be equal to that of the whole set of $n_g$ satellites at altitude g in a given frame time. That is, $n_z$ times the left side of Eq. (48) equals $n_g$ times the right side of Eq. (48). The signal ratio in Eq. (50) is then reduced by the factor $n_z/n_g$ and as a result the ratio of the resolutions for an active system, Eq. (51), (as well as the ratio of the (S/N) at altitudes z and g) is reduced by the factor $(n_z/n_g)^{1/2}$. The whole analysis then proceeds as before. The methods given here are also applicable to detector arrays of different size. If a detector array has $(pq')_z$ elements at altitude (configuration) z and $(pq')_g$ elements at altitude (configuration) g, then it follows from Eq. (18) that for signal limited systems the signal ratio, Eq. (23), is proportional to $B=(pq')_z/(pq')_g$ and the ratio of the signal to noise terms, Eq. (29) and the ratio of the squares of the resolution, Eq. (31), is proportional to the square root of B. This also applies to low altitude satellite systems. That is, Eqs. (31A), (58), and (59) are also proportional to the square root of B. As a result, the performance of satellite systems can be improved by increasing the number of resolution elements in a detector array.

For a spherical earth, the designation of a particular great circle on the earth as being an equatorial plane is arbitrary except with respect to the rotation of the earth. Then the methods of constellation design given herein apply to any great circle of the earth. That is, the methods apply to the entire constellation of satellites and orbits which is rotated by a polar angle which can vary from 0° to 180° with respect to the polar axis.

For the case of the q satellites discussed above, the number of orbits for full earth coverage or coverage over a portion of the earth can be reduced, to as little as one orbit, using approximately equally spaced multiple sets of q satellites.

The k-fold overlapping stereo coverage, discussed above immediately preceding equation (8), gives the 3 dimensional position of each point on the earth and in the surrounding atmosphere and space over the earth at essentially each point in time. Then the 3 dimensional track of any given object, e.g., a missile, is obtained by following the location of that object as a function of time. The velocity of that object is given approximately as the change in the position of the object divided by the change in time.

It is noted that the Signal (Signal to Noise) Limited Performance and the Signal (Signal to Noise) Limited Low Altitude Satellites sections also apply to diffraction limited systems, e.g., the calculation of signal to noise ratio, with the exception of the diffraction limited resolution which is treated separately. Also, the Signal (Signal to Noise) Limited Performance section also contains the case of noise independent of signal, beginning with the discussion of equations (34)-(43), which gives essentially the same result as signal (signal to noise) limited performance as discussed immediately following equation (43).

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A high data rate ground-to-ground, satellite-to-ground or ground-to-satellite communication system comprising:
a full constellation of satellites providing contiguous/overlapping, continuous coverage of the whole earth or portion thereof, the constellation being configured to provide k-fold continuous, contiguous/overlapping or non-contiguous coverage of earth or any planet from low, intermediate, or high altitude satellites for circular or elliptical orbits making an angle greater than or equal to 0° and less than or equal to 360° with an equatorial plane for full earth coverage or for coverage for latitudes from 0° to a latitude L in the Northern and Southern hemispheres or for latitudes greater than or equal to L in the Northern and Southern hemisphere, a number of satellites and an angular coverage of the satellites being arranged to provide k-fold contiguous/overlapping coverage over a first plane of the earth and contiguous/overlapping or non-contiguous coverage over a second plane, wherein k is a positive integer, a configuration of the constellation and a minimum number of satellites being determined to produce a required coverage;
a satellite transmitting and receiving station on at least one satellite, the station configured to transmit signals to and receive signals from the earth and adjacent satellites; and
a cell phone transmitting and receiving station in a cell phone area, the station being configured to transmit signals to and receive signals from satellites,
the satellites being positioned, spaced and configured to use direct line of sight between a transmitting cell phone station and a receiving satellite, and between adjacent satellites to transfer calls from a receiving satellite to a transmitting satellite with a line of sight view of the receiving cell phone station.

2. The system of claim 1, wherein the satellites are at an altitude lower than a conventional geosynchronous or low altitude communication system.

3. The system of claim 1, further comprising one or more individual cell phone units and wherein the satellites are configured to directly communicate with the one or more individual cell phone units.

4. The system of claim 1, wherein the satellites provide contiguous or overlapping, continuous coverage of the entire earth.

5. The system of claim 1, wherein at least one of the satellites is positioned and spaced such that there is a direct line of sight between adjacent satellites.

6. The system of claim 5, wherein the positioning and spacing is such that the at least one satellite can see at least three satellites with a direct line of sight.

7. A high data rate ground-to-ground, satellite-to-ground or ground to satellite communication system comprising:
- a full constellation of satellites providing contiguous/overlapping, continuous coverage of the whole earth or portion thereof, the constellation being configured to provide k-fold continuous, contiguous/overlapping or non-contiguous coverage of earth or any planet from low, intermediate, or high altitude satellites for circular or elliptical orbits making an angle greater than or equal to 0° and less than or equal to 360° with an equatorial plane for full earth coverage or for coverage for latitudes from 0° to a latitude L in the Northern and Southern hemispheres or for latitudes greater than or equal to L in the Northern and Southern hemisphere, a number of satellites and an angular coverage of the satellites being arranged to provide k-fold contiguous/overlapping coverage over a first plane of the earth and contiguous/overlapping or non-contiguous coverage over a second plane, wherein k is a positive integer, a configuration of the constellation and a minimum number of satellites being determined to produce a required coverage;
- a satellite transmitting and receiving station on at least one satellite, the station configured to transmit signals to and receive signals from the earth and adjacent satellites; and
- a plurality of individual cell phone units in a cell phone area, the individual cell phone units being configured to transmit signals to and receive signals from the satellites,
- the satellites being positioned, spaced and configured to use direct line of sight between a transmitting cell phone and a receiving satellite, and between adjacent satellites to transfer calls from a receiving satellite to a transmitting satellite with a line of sight view of the receiving cell phone.

* * * * *